United States Patent
Dave et al.

(10) Patent No.: US 6,516,436 B1
(45) Date of Patent: Feb. 4, 2003

(54) ERROR CONTROL CODING FOR TRANSMISSION EQUIPMENT PROTECTION

(75) Inventors: Bharat P. Dave, Howell, NJ (US); Adriaan J. De Lind Van Wijngaarden, Basking Ridge, NJ (US); Brij B. Garg, Salem, NH (US); James S. Lavranchuk, Belle Mead, NJ (US); Boris B. Stefanov, Murray Hill, NJ (US); Rudiger L. Urbanke, Murray Hill, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/483,056

(22) Filed: Jan. 13, 2000

Related U.S. Application Data

(60) Provisional application No. 60/123,297, filed on Mar. 4, 1999.

(51) Int. Cl.[7] ................. H03M 13/00; H03K 19/003
(52) U.S. Cl. ............................. 714/753; 714/18
(58) Field of Search ........................ 714/752, 4, 776, 714/18

(56) References Cited

U.S. PATENT DOCUMENTS

| | | | |
|---|---|---|---|
| 5,532,744 A | * | 7/1996 | Akiwumi-Assani et al. ..... 348/390.1 |
| 5,771,081 A | * | 6/1998 | Lee ............................. 348/466 |
| 5,844,919 A | * | 12/1998 | Glover et al. .................. 714/6 |
| 5,999,518 A | * | 12/1999 | Nattkemper et al. ......... 370/258 |

FOREIGN PATENT DOCUMENTS

EP          0 977 391 A2 *   7/1999   ............. H04J/3/12

* cited by examiner

*Primary Examiner*—Albert Decady
*Assistant Examiner*—C R Harris
(74) *Attorney, Agent, or Firm*—Mendelsohn and Associates PC

(57) ABSTRACT

Error control coding is applied to data streams transmitted through transmission equipment such as a telecommunications switch having a distributed synchronous switch fabric. Each k-symbol dataword is encoded to generate an n-symbol codeword that is then sliced for transmission through the transmission equipment. After routing, error-correction decoding is applied to the resulting routed n-symbol codeword to detect and correct one or more errors in the codeword to generate a k-symbol routed dataword that is identical to the original incoming dataword. Depending on the coding scheme, different types and numbers of errors can be corrected in each codeword. For example, for Reed-Solomon [12, 8, 5] coding with Galois field ($2^4$), corrections can be made for up to four erasures with no random errors, up to two erasures and one; random error, or up to two random errors with no erasures. In this way, error-less fault tolerance can be provided that ensures the accuracy of transmission processing in the event of certain combinations of errors. Preferred embodiments involve temporal sharing of components (for more cost effective implementations) and shuffling of data (to increase error-correction coverage).

42 Claims, 13 Drawing Sheets

| 1-TXI-A | 1,1 | 1,4 | 1,7 | 1,10 | 1,2 | 1,5 | 1,8 | 1,11 | 1,3 | 1,6 | 1,9 | 1,12 |
|---|---|---|---|---|---|---|---|---|---|---|---|---|
| 1-TXI-B | 1,13 | 1,16 | 1,19 | 1,22 | 1,14 | 1,17 | 1,20 | 1,23 | 1,15 | 1,18 | 1,21 | 1,24 |
| 1-TXI-P1 | 1,C1 | 1,C16 | 1,C7 | 1,C22 | 1,C2 | 1,C17 | 1,C8 | 1,C23 | 1,C3 | 1,C18 | 1,C9 | 1,C24 |
| 2-TXI-A | 2,1 | 2,4 | 2,7 | 2,10 | 2,2 | 2,5 | 2,8 | 2,11 | 2,3 | 2,6 | 2,9 | 2,12 |
| 2-TXI-B | 2,13 | 2,16 | 2,19 | 2,22 | 2,14 | 2,17 | 2,20 | 2,23 | 2,15 | 2,18 | 2,21 | 2,24 |
| 2-TXI-P1 | 2,C1 | 2,C16 | 2,C7 | 2,C22 | 2,C2 | 2,C17 | 2,C8 | 2,C23 | 2,C3 | 2,C18 | 2,C9 | 2,C24 |
| 3-TXI-A | 3,1 | 3,4 | 3,7 | 3,10 | 3,2 | 3,5 | 3,8 | 3,11 | 3,3 | 3,6 | 3,9 | 3,12 |
| 3-TXI-B | 3,13 | 3,16 | 3,19 | 3,22 | 3,14 | 3,17 | 3,20 | 3,23 | 3,15 | 3,18 | 3,21 | 3,24 |
| 3-TXI-P1 | 3,C1 | 3,C16 | 3,C7 | 3,C22 | 3,C2 | 3,C17 | 3,C8 | 3,C23 | 3,C3 | 3,C18 | 3,C9 | 3,C24 |
| 4-TXI-A | 4,1 | 4,4 | 4,7 | 4,10 | 4,2 | 4,5 | 4,8 | 4,11 | 4,3 | 4,6 | 4,9 | 4,12 |
| 4-TXI-B | 4,13 | 4,16 | 4,19 | 4,22 | 4,14 | 4,17 | 4,20 | 4,23 | 4,15 | 4,18 | 4,21 | 4,24 |
| 4-TXI-P1 | 4,C1 | 4,C16 | 4,C7 | 4,C22 | 4,C2 | 4,C17 | 4,C8 | 4,C23 | 4,C3 | 4,C18 | 4,C9 | 4,24C |

[1-4]-TXI-[A,B,P1] 12 → SHUFFLE BLOCK 1 → [G1]-TXI-[1-8,P1-P4] 12

| G1-TXI-1 | 1,1 | 2,1 | 3,1 | 4,1 | 1,2 | 2,2 | 3,2 | 4,2 | 1,3 | 2,3 | 3,3 | 4,3 |
|---|---|---|---|---|---|---|---|---|---|---|---|---|
| G1-TXI-2 | 1,4 | 2,4 | 3,4 | 4,4 | 1,5 | 2,5 | 3,5 | 4,5 | 1,6 | 2,6 | 3,6 | 4,6 |
| G1-TXI-P1 | 1,C1 | 2,C1 | 3,C1 | 4,C1 | 1,C2 | 2,C2 | 3,C2 | 4,C2 | 1,C3 | 2,C3 | 3,C3 | 4,C3 |
| G1-TXI-3 | 1,7 | 2,7 | 3,7 | 4,7 | 1,8 | 2,8 | 3,8 | 4,8 | 1,9 | 2,9 | 3,9 | 4,9 |
| G1-TXI-4 | 1,10 | 2,10 | 3,10 | 4,10 | 1,11 | 2,11 | 3,11 | 4,11 | 1,12 | 2,12 | 3,12 | 4,12 |
| G1-TXI-P2 | 1,C7 | 2,C7 | 3,C7 | 4,C7 | 1,C8 | 2,C8 | 3,C8 | 4,C8 | 1,C9 | 2,C9 | 3,C9 | 4,C9 |
| G1-TXI-5 | 1,15 | 2,15 | 3,15 | 4,15 | 1,13 | 2,13 | 3,13 | 4,13 | 1,14 | 2,14 | 3,14 | 4,14 |
| G1-TXI-6 | 1,18 | 2,18 | 3,18 | 4,18 | 1,16 | 2,16 | 3,16 | 4,16 | 1,17 | 2,17 | 3,17 | 4,17 |
| G1-TXI-P3 | 1,C18 | 2,C18 | 3,C18 | 4,C18 | 1,C16 | 2,C16 | 3,C16 | 4,C16 | 1,C17 | 2,C17 | 3,C17 | 4,C17 |
| G1-TXI-7 | 1,21 | 2,21 | 3,21 | 4,21 | 1,19 | 2,19 | 3,19 | 4,19 | 1,20 | 2,20 | 3,20 | 4,20 |
| G1-TXI-8 | 1,24 | 2,24 | 3,24 | 4,24 | 1,22 | 2,22 | 3,22 | 4,22 | 1,23 | 2,23 | 3,23 | 4,23 |
| G1-TXI-P4 | 1,C24 | 2,C24 | 3,C24 | 4,C24 | 1,C22 | 2,C22 | 3,C22 | 4,C22 | 1,C23 | 2,C23 | 3,C23 | 4,C23 |

FIG. 18

| | SYMBOL ENCODERS a1, a2 | | | | | | SYMBOL ENCODERS b1, b2 | | | | | |
|---|---|---|---|---|---|---|---|---|---|---|---|---|
| | SET 1 | | SET 2 | | SET 3 | | SET 4 | | SET 5 | | SET 6 | |
| BYTE | BLOCK 1 BITS[0-3] | BLOCK 2 BITS[4-7] | BLOCK 3 BITS[0-3] | BLOCK 4 BITS[4-7] | BLOCK 5 BITS[0-3] | BLOCK 6 BITS[4-7] | BLOCK 7 BITS[0-3] | BLOCK 8 BITS[4-7] | BLOCK 9 BITS[0-3] | BLOCK 10 BITS[4-7] | BLOCK 11 BITS[0-3] | BLOCK 12 BITS[4-7] |
| BYTE1 | 1 | 1 | 2 | 2 | 3 | 3 | 25 | 25 | 26 | 26 | 27 | 27 |
| BYTE2 | 4 | 4 | 5 | 5 | 6 | 6 | 28 | 28 | 29 | 29 | 30 | 30 |
| BYTE3 | 7 | 7 | 8 | 8 | 9 | 9 | 31 | 31 | 32 | 32 | 33 | 33 |
| BYTE4 | 10 | 10 | 11 | 11 | 12 | 12 | 34 | 34 | 35 | 35 | 36 | 36 |
| BYTE5 | 13 | 13 | 14 | 14 | 15 | 15 | 37 | 37 | 38 | 38 | 39 | 39 |
| BYTE6 | 16 | 16 | 17 | 17 | 18 | 18 | 40 | 40 | 41 | 41 | 42 | 42 |
| BYTE7 | 19 | 19 | 20 | 20 | 21 | 21 | 43 | 43 | 44 | 44 | 45 | 45 |
| BYTE8 | 22 | 22 | 23 | 23 | 24 | 24 | 46 | 46 | 47 | 47 | 48 | 48 |
| CODE BYTE1 | C1 | C1 | C2 | C2 | C3 | C3 | C25 | C25 | C26 | C26 | C27 | C27 |
| CODE BYTE2 | C16 | C16 | C17 | C17 | C18 | C18 | C40 | C40 | C41 | C41 | C42 | C42 |
| CODE BYTE3 | C7 | C7 | C8 | C8 | C9 | C9 | C31 | C31 | C32 | C32 | C33 | C33 |
| CODE BYTE4 | C22 | C22 | C23 | C23 | C24 | C24 | C46 | C46 | C47 | C47 | C48 | C48 |

TABLE 2 BYTE ASSIGNMENTS FOR ENCODER AND ASSOCIATED OUTPUTS

ERROR CONTROL CODING FOR TRANSMISSION EQUIPMENT PROTECTION

CROSS-REFERENCE TO RELATES APPLICATIONS

This application claims the benefit of the filing date of U.S. provisional application No. 60/123,297, filed on Mar. 4, 1999.

BACKGROUND OF THE INVENTION

1. Field of the Invention

The present invention relates to signal processing, and, in particular, to error protection for the routing of signals through telecommunications systems.

2. Description of the Related Art

A typical telecommunications system has one or more switches that route signals for transmission between pairs of end users of the system. Each switch is able simultaneously to receive incoming signals originating at a plurality of different end users and route those received incoming signals for transmission as outgoing signals to a plurality of different destinations (i.e., various end users). In general, a switch is able to route signals from any given end user to any one or more other given end user(s).

In order to maintain a high quality of communications service, it is very important for the switches of a telecommunications system to operate efficiently and reliably. In the past, telecommunications systems carried only telephony (i.e., voice) signals between telephone end users. Then, it was acceptable for a switch to fail to operate properly for short periods of time (e.g., up to 60 msec) without adversely affecting the quality of the service provided to the end users, since the human ear can tolerate gaps in telephony service of that duration. As long as the existence of a failure was detected and the switch to redundant protection hardware was made within 60 msec of the failure, telephony system requirements for fault tolerance would be met. Such a recovery from a switch failure is referred to as hit-less protection switching.

Today, however, telecommunications systems are being used to transmit data signals as well as telephony signals. In such applications, any failure of a switch to operate properly, even an intermittent failure lasting only a very short duration, may result in a loss of data that would be unacceptable to one or more of the end users of the telecommunications system. As such, it is desirable and often mandatory for telecommunications systems to provide fault tolerance with robustness against errors in which no data is lost as a result of (at least) any one single-point failure in a switch.

One way to provide such "error-less fault tolerance" is to buffer enough data on the output side of the switch to provide enough time for fault tolerance processing to detect the occurrence of a failure and switch processing to redundant protection hardware as needed to resume accurate switching operations without losing any data. Unfortunately, as data transmission rates and switch throughput increase, the buffer size and transmission delay required to ensure error-less fault tolerance becomes cost prohibitive, and the increased buffering adversely increases the latency of the switch. Moreover, typical prior-art fault tolerance schemes will not detect or prevent random errors, such as spurious random bit or symbol errors, from corrupting the routed data.

SUMMARY OF THE INVENTION

The present invention is directed to a technique for providing fault tolerance in transmission equipment, such as a telecommunications switch. The present invention protects the integrity of signal routing operations from one—and, depending on the implementation, even more than one—failure within the equipment. Moreover, the present invention enables signal routing operations to proceed without any loss of data, and without requiring substantial buffering of data. Such error-less fault tolerance enables signal routing operations to proceed seamlessly in the event of either intermittent or permanent failures as well as during routine equipment maintenance.

The present invention can be applied to a data transmission system that meets the following two conditions. First, the system is distributed, meaning that transmission processing is spread over several elements such that different elements route different subsets of data, where one or more of the elements may have impaired functionality that needs to be protected. Examples of such elements include integrated circuits, electrical links, circuit packs, optical links, and electrical-to-optical conversion devices. Second, the system has excess capacity, meaning that certain elements are present in the system, but are not used when no impairment has occurred.

For such systems, errorless control coding for equipment protection can be implemented as follows. First, an encoder is added to each signal stream at the input to the equipment and a decoder is added to each signal stream at the output of the equipment. (Note that, depending on the implementation, there may be more than one encoder/decoder for each signal stream or more than one signal stream for each encoder/decoder.) Second, the path of the encoded stream through the equipment is analyzed and the consequence of the failure(s) of any element(s) upon the stream at the decoder input is tabulated. Third, suitable encoding/decoding algorithms are designed to complement the design of the distributed processing in the equipment such that the effects of elemental failures can be errorlessly corrected. Note that iteration between these last two items may be needed for their successful implementation. The choice of coding algorithm and the system design may affect other performance measures such as transmission delay and circuit complexity. In general, the present invention can be used to provide error correction for a single element failure and, depending on the particular coding scheme, possibly multiple (dependent or independent) element failures.

According to embodiments of the present invention directed to telecommunications switches, an error control coding (ECC) scheme, such as an appropriate symbolic coding scheme, is applied to the data at the input side of a switch to generate encoded data, which is then transmitted through the distributed switch fabric of the switch. The encoded data carries additional symbols requiring additional switch capacity. The encoded data is then analyzed at the output side of the switch fabric to determine whether any errors occurred during transmission through the switch fabric. In preferred embodiments, error correction is also applied to recover from a single failure—and, depending on the particular coding scheme, possibly multiple (dependent or independent) failures—in the switch fabric. As such, the present invention is able to provide error-less fault tolerance, where no data is lost, even in the case of multiple failures within the switch fabric.

In one embodiment, the present invention is a method for transmitting data streams, comprising the steps of (a) encoding a k-symbol original dataword in an incoming data stream to generate an n-symbol codeword, wherein n is greater than k; (b) slicing each n-symbol codeword into a plurality of codeword slices: (c) routing the codeword slices through distributed transmission equipment to generate a plurality of routed codeword slices; (d) combining the plurality of routed codeword slices to generate an n-symbol routed codeword; and (e) decoding the n-symbol routed codeword to generate a k-symbol routed dataword of an outgoing data stream corresponding to the k-symbol original dataword in the incoming data stream.

In another embodiment, the present invention is an apparatus for transmitting data streams, comprising (a) one or more encoders configured to encode a k-symbol original dataword in an incoming data stream to generate an n-symbol codeword, wherein n is greater than k; (b) one or more slicers configured to slice each n-symbol codeword into a plurality of codeword slices; (c) distributed transmission equipment configured to route the codeword slices to generate a plurality of routed codeword slices; (d) one or more combiners configured to combine the plurality of routed codeword slices to generate an n-symbol routed codeword; and (e) one or more decoders configured to decode the n-symbol routed codeword to generate a k-symbol routed dataword of an outgoing data stream corresponding to the k-symbol original dataword in the incoming data stream.

BRIEF DESCRIPTION OF THE DRAWINGS

Other aspects, features, and advantages of the present invention will become more fully apparent from the following detailed description, the appended claims, and the accompanying drawings in which:

FIG. 18 shows Table 2, which tabulates the byte assignments for the encoders of FIG. 14.

DETAILED DESCRIPTION

Figure 1:
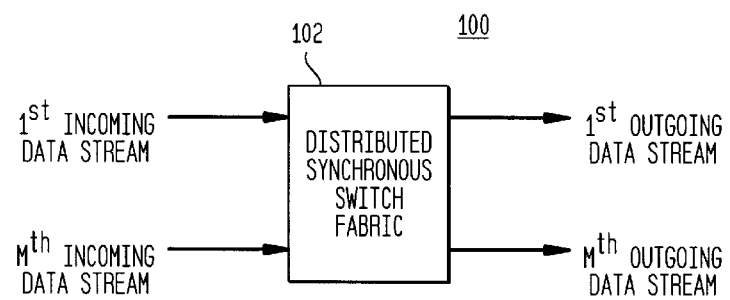
FIG. 1 shows a high-level block diagram of a telecommunications switch, according to one embodiment of the present invention.

FIG. 1 shows a high-level block diagram of a telecommunications switch 100, according to one embodiment of the present invention. Switch 100 receives Mincoming data streams and routes those incoming data streams in parallel through distributed synchronous switch fabric 102 to generate M corresponding outgoing data streams, where each incoming data stream is typically routed to a different one (or more) of the Moutgoing data stream(s). In general, each incoming data stream is routed to one (or more) particular outgoing data stream(s). Although in this embodiment, the present invention is described in the context of a telecommunications switch having a distributed synchronous switch fabric, it will be understood that the present invention can be implemented in the context of other distributed data transmission systems having excess capacity, including systems having distributed a synchronous switch fabrics and/or systems in which the protected processing elements are not necessarily all co-located.

Figure 2:
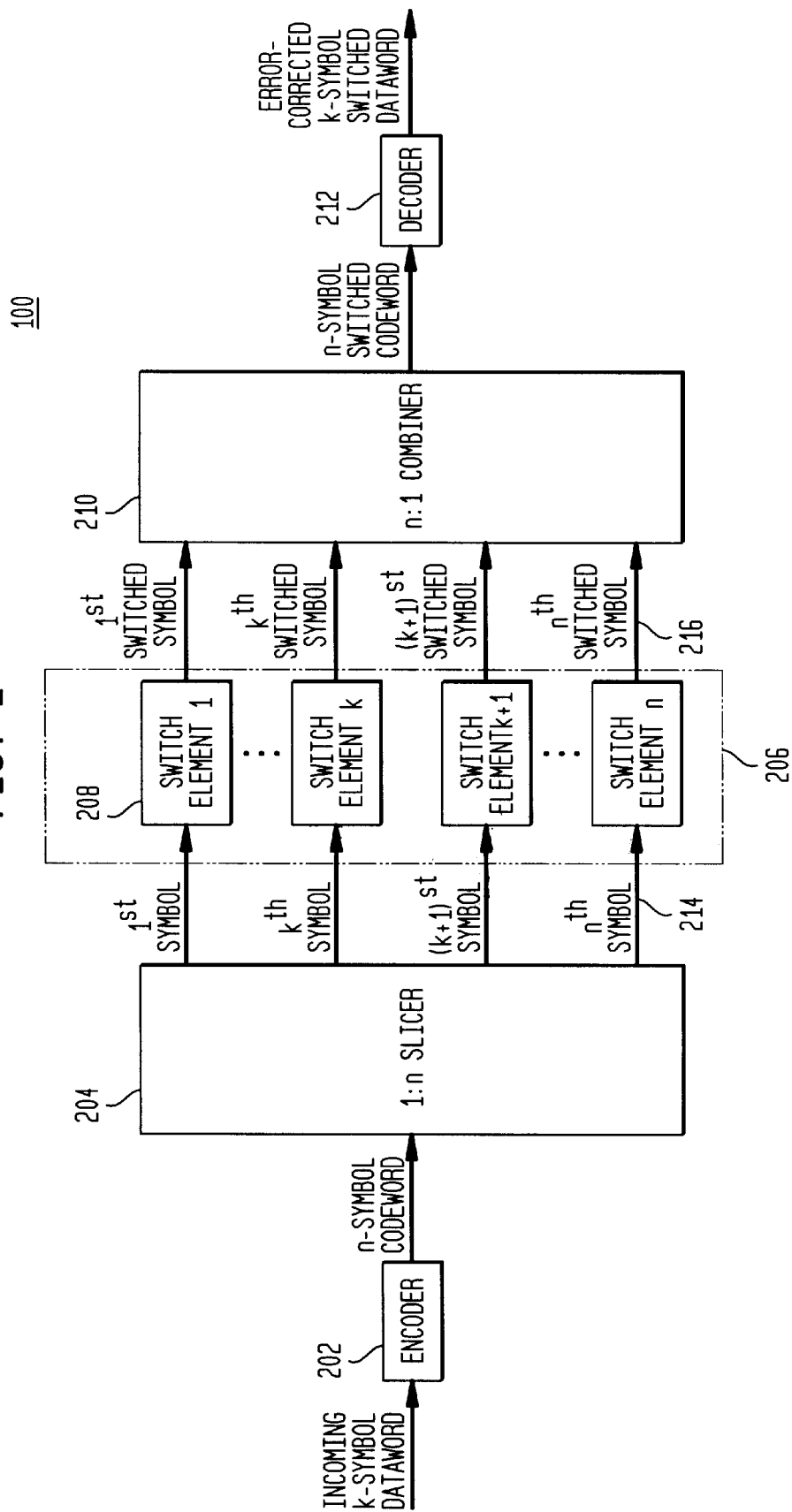
FIG. 2 shows a block diagram representing the processing of a single incoming data stream and its corresponding outgoing data stream through switch of FIG. 1.

FIG. 2 shows a block diagram representing the processing of one of the M incoming data streams and its corresponding outgoing data stream through switch 100 of FIG. 1. FIG. 2 shows an encoder 202, a 1:n slicer 204, a distributed synchronous switch fabric 206 comprising n parallel switch elements 208, an n:1 combiner 210, and a decoder 212. To every k-symbol dataword in the incoming data stream (where each dataword symbol contains m bits of data information), encoder 202 applies an appropriate encoding algorithm to generate an n-symbol codeword (where each codeword symbol contains m bits of code information). 1:n slicer 204 slices the n-symbol codeword into n parallel incoming symbol streams 214, each with one of the m-bit codeword symbols of the n-symbol codeword. The codeword symbol in each incoming symbol stream is then routed through a corresponding switch element 208 in switch fabric 206 to a corresponding outgoing symbol stream 216. Switch elements 208 are collectively responsible for sending each incoming data stream indicated in FIG. 1 to the corresponding outgoing data stream. The n switched codeword symbols transmitted along the n outgoing symbol streams 216 are received by n:1 combiner 210, which collects and reassembles the n switched codeword symbols to form an n-symbol switched codeword. Decoder 212 applies an appropriate error-correcting decoding algorithm corresponding to the encoding algorithm applied by encoder 202 to generate an error-corrected k-symbol dataword for the corresponding outgoing signal.

In one implementation of switch 100, each incoming data stream shown in FIG. 1 has its own encoder 202 and 1:n slicer 204 and each outgoing data stream shown in FIG. 1 has its own n:1 combiner 210 and decoder 212, while all i pairs of incoming and outgoing data streams in FIG. 1 share the same switch fabric 206, where each switch element 208 routes a different codeword symbol of each incoming codeword symbol stream towards its corresponding outgoing codeword symbol stream.

During proper switch operations, all of the switch elements 208 in switch fabric 206 apply identical routing processing to accurately route different codeword symbols corresponding to the different incoming data streams. For example, the first switch element 208 routes the first codeword symbol of each codeword corresponding to each incoming data stream using the same routing processing as the second switch element 208, which routes the second codeword symbol of each codeword corresponding to each incoming data stream, as so forth for all n switch elements 208 in switch fabric 206.

Unfortunately, errors may occur within distributed switch fabric 206 during the routing processing being performed by one or more of the individual switch elements 208. One type of error corresponds to random bit/symbol errors that may occur from time to time during switch processing. Another type of error corresponds to a situation in which a switch element suffers a catastrophic failure that prevents it from operating properly for an extended period of time. In such case, the symbols generated by a failed switch element may contain all 0's or all 1's or just random noise. By selecting an appropriate encoding/decoding scheme for encoder 202 and decoder 212, certain errors in the codewords routed through distributed switch fabric 206 can be detected and corrected in real time to ensure that each outgoing k-symbol dataword in each outgoing data stream is identical to the corresponding incoming k-symbol dataword in the corresponding incoming data stream.

One error control coding scheme suitable for certain implementations of the present invention is based on the systematic Reed-Solomon (RS) [12, 8, 5] code over Galois field (GF) ($2^4$), where n=12 is the number of symbols per codeword, k=8 is the number of symbols per dataword, $d_{min}$=5 is the minimum distance, and m=4 is the number of bits per symbol. Systematic codes, like the RS [12, 8, 5] code, leave the original data (i.e., the information symbols) unchanged and form codewords by adding one or more code symbols to the original datawords. In the RS [12, 8, 5] code, 8 of the 12 codeword symbols are identical to the 8 incoming information symbols, and the remaining 4 codeword symbols are code symbols generated from the 8 incoming information symbols.

A decoder for an RS [12, 8, 5] code is able to identify and correct errors in each 12-symbol codeword (including errors in the code symbols themselves) based on the following function of the minimum distance $d_{min}$:

$$2f_r + f_e < d_{min},$$

where $f_r$ is the number of random errors and $f_e$ is the number of erasures. A random error is an error in a codeword symbol, where the location of the codeword symbol is not known ahead of time. An erasure, on the other hand, is an error in a codeword symbol, where the location of the errored codeword symbol is known ahead of time. Since the minimum distance $d_{min}$ equals 5, the RS [12, 8, 5] code can be used to correct the following simultaneous combinations of errors (that is, one or more errors in any given 12-symbol codeword):

Up to $f_e$=4 erasures with no random errors (i.e., $f_r$=0);
Up to $f_e$=2 erasures with $f_r$=1 random error; or
Up to $f_r$=2 random errors with no erasures (i.e., $f_e$=0).

The occurrence of a random bit/symbol error somewhere in a codeword is an example of a random error, because the exact location of the error in the entire 12-symbol codeword is not known prior to decoding the codeword, and the error will likely not be repeated in the next codeword. On the other hand, knowledge that a particular switch element in a switch fabric has failed can be used to identify an erasure in the 12-symbol codeword, because the same corresponding symbol will be erroneous in each codeword.

Referring again to FIG. 2, when implemented for the RS [12, 8, 5] code, the number of information symbols per dataword (k) is 8, and the total number of information and code symbols per codeword (n) is 12. As such, encoder 202 encodes each 8-symbol dataword into a 12-symbol codeword, where the first 8 codeword symbols may be specified to correspond to the 8 incoming information symbols and the last 4 codeword symbols may be specified to correspond to the 4 code symbols. In that case, with slicer 204 implemented as a 1:12 slicer, switch fabric 206 can be implemented using 12 parallel switch elements 208, where the first 8 switch elements (i.e., Switch Element 1 through Switch Element k=8 in FIG. 2) switch the 8 information symbols in each 12-symbol codeword and the last 4 switch elements (i.e., Switch Element k+1=9 through Switch Element n=12 in FIG. 2) switch the 4 code symbols. Combiner 210 is then implemented as a 12:1 combiner, and decoder 212 applies appropriate RS [12, 8, 5] decoding to convert each switched 12-symbol codeword into an error-corrected 8-symbol dataword in the corresponding outgoing data stream.

In a preferred implementation, decoder 212 keeps track of the number of consecutive errors detected in each codeword symbol. When a particular codeword symbol is errored for a specified number (e.g., 4) of consecutive codewords in a row, decoder 212 determines that the corresponding switch element 208 has failed and identifies that codeword symbol as an erasure. Similarly, an erasure is cleared if no error is detected in the errored data location for a specified number (e.g., 4) of consecutive codewords in a row. In addition to simply correcting errors in the data, the identification of erasures can be used to pin-point the location of the equipment fault by examining the set of erasures identified by the entire set of decoders in the system. A particular fault will excite a specific set of erasures which in turn can be used to identify the location of that fault.

Multiple error correcting RS codes are generally decoded using algorithmic procedures, such as the Massey-Berlekamp algorithm. However, these algorithms are not very easy to implement and require a lot of steps for decoding. For these reasons, they may be too slow for hardware implementation. Preferred embodiments of the present invention are based on careful selection of the parameters of the code to enable use of a direct solution method. The small field GF ($2^4$) allows us to implement arithmetic functions over GF($2^4$), such as multiplication and inversion, with relatively few logic gates. Because of the small size of the encoder and the decoder, it is possible to integrate many encoders/decoders onto one device and to use pipelining as well.

The RS [12, 8, 5] code provides particular advantages for certain types of switch architectures and sets of processing requirements. For example, because 4 code symbols are added to every 8-symbol dataword, the present invention can be implemented using existing switch fabrics having 50% . redundancy (also referred to as excess capacity). Those skilled in the art will understand that some prior-art switches rely on switch fabrics having 50% redundancy to implement 1×2 fault tolerance schemes in which a redundant bank of idle switch elements is available to replace one of two main banks of working switch elements upon detection of a failure in either main bank.

The present invention provides specific advantages, however, over those prior-art 1×2 fault tolerance schemes. In particular, unless a sufficient amount of data is buffered, the prior-art schemes cannot provide error-less switching in the event of a switch element failure. The present invention, on the other hand, can be implemented to provide error-less switching in the event of one—or even more than one—switching error, including "intermittent" random errors as well as "permanent" switch element failures.

Another advantage of the present invention applies to certain switch fabrics in which individual switch elements 208 are physically implemented as part of switch modules (i.e., circuit packs) containing two or more switch elements each. For example, in an implementation with three switch elements per switch module, after failure of a particular switch element, when the corresponding three-element switch module is being replaced, or, during routine maintenance, when a three-element switch module may be taken off line, the three corresponding slices can be designed to fall into three separate code groups such that each will appear as a single failure per code group. A shuffling operation (as described later in this specification with regard to FIGS. 13 and 15) can be employed to diversify bunched failures into separate code groups. Since two random errors can be corrected with the RS [12, 8, 5] code, additional failures can also be errorlessly protected. Furthermore, after a few occurrences (e.g., 10), the failures can be marked as erasures, thereby increasing the capacity of the system to errorlessly protect against additional failures.

Although the encoding processing of encoder 202 and decoding and error correction processing of decoder 212 add latency to the routing of data streams through switch 100, this latency can be kept to an acceptably small level by selecting an appropriate symbol size and block length. For example, in one particular implementation, the coding scheme relies on 4-bit symbols, where, for each incoming data stream, switch 100 has two instances of the encoder and the decoder in the architecture shown in FIG. 2, in which one instance processes the 4 most significant bits (MSBs) of each 8-bit byte of information and the other instance processes, in parallel, the 4 least significant bits (LSBs) of each 8-bit byte of information.

As shown in the implementation of FIG. 2, the switch fabric 206 contains as many switch elements 208 as there are symbols in each codeword (i.e., 12). Those skilled in the art will understand that, in alternative implementations, the number of switch elements in the switch fabric (and therefore the degree of slicing performed by slicer 204) may be larger or smaller than the number of symbols per codeword. The exact number may depend on particular hardware constraints and/or processing requirements. Typically, one purpose of slicing is to divide the processing into smaller sections for easier realization or dividing the system into sub-systems that can be unplugged for maintenance. The encoder and decoder are designed, taking slicing into account, to superimpose coding for errorless protection. The purpose of shuffle block is to diversify the slices further to protect against bunched failures.

The present invention has been described in the context of the Reed-Solomon [12, 8, 5] code over GF ($2^4$). Those skilled in the art will understand that other types of error control coding schemes can be used including non-systematic codes that change the original information symbols when generating codewords, or even non-symbolic codes. The particular coding scheme selected will depend on the particular characteristics of the switch architecture (e.g., the total number of parallel switch elements in the distributed synchronous switch fabric, the number of symbols processed by each element, the number of switch elements per switch module) as well as the particular processing requirements for the switch (e.g., maximum latency, maximum buffer size, number of simultaneous random errors and/or erasures to be corrected). Other types of coding schemes that may be suitable include other Reed-Solomon codes as well as other systematic codes. In general, each different coding scheme involves a different trade-off between overhead, speed, latency, and hardware requirements. In principle, the present invention could be implemented in some form using almost any error control coding scheme.

The present invention has been described in the context of routing a large number of data streams corresponding to telecommunications signals in parallel through a distributed synchronous switch fabric, in which all of the switch elements in the switch fabric operate in parallel in a synchronous manner. Those skilled in the art will understand that the present invention can also be implemented in other contexts. For example, the symbol encoding/error correction decoding scheme of the present invention can be applied to other types of communications systems in which different portions of each of one or more incoming signals are processed along different parallel synchronous or asynchronous transmission paths to form one or more corresponding outgoing signals.

Reed-Solomon Codes

Reed-Solomon codes are multiple-error correcting block codes with a block length of n symbols, k of which are information symbols. The code words consist of a message part of k unaltered information symbols and a redundant checking part of (n−k) parity-check or code symbols. Every symbol consists of m bits, and all operations are consequently performed over GF ($2^m$). The length n is bounded by $n \leq 2^m - 1$. In other words, the number of bits per symbol determines the maximal word length. The minimum distance of this code is equal to $d_{min} = (n-k)+1$. This specification uses the compact notation RS [n, k, $d_{min}$] code over GF ($2^m$) to refer to such Reed-Solomon codes.

If a code word of an RS [n, k, $d_{min}$] code is received with $f_r$ random symbol errors and $f_e$ symbol erasures, any combination of the random errors and the erasures can be corrected as long as $2f_r + f_e < d_{min}$. Note that if a symbol consists of 4 bits, errors in that symbol may occur in one to four bits of that symbol (which corresponds to one to four bit errors), but, for the purpose of decoding, each of these types of errors corresponds to only a single symbol error. The type of errors that are expected to occur as a result of an internal failure are byte-oriented and can occur in blocks of three bytes. Using a systematic interleaving strategy, it is possible to obtain a configuration where the number of errors in short blocks is limited for every error event. Since most error events are byte-oriented, it is important to maintain byte alignment.

One possible implementation is to split each set of 48 information bytes in each incoming OC-48 data signal into six blocks of 8 information bytes, each protected by an RS [12, 8, 5] code over GF ($2^8$). It is even more attractive to further split each set of 8 information bytes into two sets of 4-bit symbols, and to use an RS [12, 8, 5] code over GF ($2^4$). The advantage of performing the operations over GF ($2^4$), instead of GF ($2^8$), is the lower gate count and the smaller latency for multiplications and inversions. It will therefore be possible to perform several consecutive operations within one clock cycle. In particular, the multiplication and the division in GF ($2^8$) require more than twice as many gates, and the latency will also be higher.

It is not advantageous to use an RS code with a larger block length, e.g., an RS [24, 16, 9] code, an RS [36, 24, 13] code, or an RS [72, 48, 25] code over OF ($2^8$), since the number of errors and erasures scales linearly with the length of the code, while, at the same time, the RS decoder becomes more complex. Since the minimum distance of the short codes is small, direct solution methods instead of algorithmic solution methods can be employed. If more than two errors have to be corrected, the Massey-Berlekamp algorithm and the Chien search can be used.

The use of an RS [12, 8, 5] code over GF ($2^4$) allows the structure and implementation complexity of the decoder to be relatively simple and the latency to be small. It is therefore expected to be feasible to use a parallel architecture of possibly pipelined encoders and decoders.

In the next sections, a particular implementation of the RS [12, 8, 5] code over GF ($2^4$) is described, and the operation of the encoder and the decoder for this RS code are specified. A highly parallelized architecture of short, systematically interleaved Reed-Solomon codes allows correction of random errors and localized errors (erasures) and identification of the underlying failures. By using multiple pipelined encoders and decoders in parallel, the required throughput for very high speed channels can be attained.

Reed-Solomon [12, 8, 5] Code over GF ($2^4$)

In one embodiment, a Reed-Solomon code with symbols from the Galois field GF ($2^4$) is used with a word-length of twelve symbols, eight of which are information symbols. The minimum distance of this code, $d_{min}$, is equal to 5. The field GF ($2^4$) is an extension field of GF (2) constructed with the primitive polynomial $p(X)=X^4+X+1$. Elements of GF ($2^4$) are typically represented using the exponential, polynomial, or binary notation (see Table 1). The decimal representation is given for completeness, but is not used very often.

TABLE 1

Four Representations of Elements of GF ($2^4$)
Generated by $p(X) = X^4 + X + 1$

| Power Representation | Polynomial Rep. | Binary Rep. | Decimal Rep. |
|---|---|---|---|
| 0 | 0 | 0 0 0 0 | 0 |
| $\alpha^0$ | 1 | 0 0 0 1 | 1 |
| $\alpha^1$ | $\alpha$ | 0 0 1 0 | 2 |
| $\alpha^2$ | $\alpha^2$ | 0 1 0 0 | 4 |
| $\alpha^3$ | $\alpha^3$ | 1 0 0 0 | 8 |
| $\alpha^4$ | $\alpha + 1$ | 0 0 1 1 | 3 |
| $\alpha^5$ | $\alpha^2 + \alpha$ | 0 1 1 0 | 6 |
| $\alpha^6$ | $\alpha^3 + \alpha^2$ | 1 1 0 0 | 12 |
| $\alpha^7$ | $\alpha^3 + \alpha + 1$ | 1 0 1 1 | 11 |
| $\alpha^8$ | $\alpha^2 + 1$ | 0 1 0 1 | 5 |
| $\alpha^9$ | $\alpha^3 + \alpha$ | 1 0 1 0 | 10 |
| $\alpha^{10}$ | $\alpha^2 + \alpha + 1$ | 0 1 1 1 | 7 |
| $\alpha^{11}$ | $\alpha^3 + \alpha^2 + \alpha$ | 1 1 1 0 | 14 |
| $\alpha^{12}$ | $\alpha^3 + \alpha^2 + \alpha + 1$ | 1 1 1 1 | 15 |
| $\alpha^{13}$ | $\alpha^3 + \alpha^2 + 1$ | 1 1 0 1 | 13 |
| $\alpha^{14}$ | $\alpha^3 + 1$ | 1 0 0 1 | 9 |

Basic Operations

Addition, multiplication, and inversion of elements of GF ($2^4$) are commonly specified in terms of binary 4-tuples. Let an element $A \in GF$ ($2^4$) be represented by a binary 4-tuple, i.e., $A=(a_3, a_2, a_1, a_0)$, where $a_i \in GF$ ($2^4$). The addition of the elements A, $B \in GF$ ($2^4$) is given by:

$$(a_3+b_3, a_2+b_2, a_1+b_1, a_0+b_0)$$

where the operator "+" denotes modulo-2 addition. It is clear that addition of elements over GF ($2^4$) requires only 4 XOR gates.

The multiplication $C=A \cdot B$ over GF ($2^4$) of two elements A, $B \in GF$ ($2^4$) is given by:

$$\begin{bmatrix} c_0 \\ c_1 \\ c_2 \\ c_3 \end{bmatrix} = \begin{bmatrix} a_0 & a_3 & a_2 & a_1 \\ a_1 & a_0+a_3 & a_2+a_3 & a_1+a_2 \\ a_2 & a_1 & a_0+a_3 & a_2+a_3 \\ a_3 & a_2 & a_1 & a_0+a_3 \end{bmatrix} \begin{bmatrix} b_0 \\ b_1 \\ b_2 \\ b_3 \end{bmatrix}$$

A straightforward implementation of these equations requires 16 AND and 15 XOR gates and has a delay of $T_{AND}+3T_{XOR}$.

Similarly, the inversion $B=A^{-1}$ of an element $A \in GF$ ($2^4$) is given by:

$$\begin{bmatrix} b_0 \\ b_1 \\ b_2 \\ b_3 \end{bmatrix} = \begin{bmatrix} a_0+a_1+a_2+a_0a_2+a_1a_2+a_0a_1a_2+a_3+a_1a_2a_3 \\ a_0a_1+a_0a_2+a_1a_2+a_3+a_1a_3+a_0a_1a_3 \\ a_0a_1+a_2+a_0a_2+a_3+a_0a_3+a_0a_2a_3 \\ a_1+a_2+a_3+a_0a_3+a_1a_3+a_2a_3+a_1a_2a_3 \end{bmatrix}$$

This operation can be implemented with 10 AND gates and 15 XOR gates.

Divisions are equivalent to one multiplication and one inversion, i.e., for any A, $B \in GF$ ($2^4$), $A/B=A \cdot B^{-1}$.

The powers $B^2$, $B^3$, and $B^4$ over GF ($2^4$) of an arbitrary element $B=(b_3, b_2, b_1, b_0) \in GF$ ($2^4$), equivalently represented by $B=b_3a^3+b_2a^2+b_1a^1+b_0$, is given by:

$$B^2 = b_3\alpha^6 + b_2\alpha^4 + b_1\alpha^2 + b_0$$
$$= b_3\alpha^3 + (b_1+b_3)\alpha^2 + b_2\alpha + (b_0+b_2)$$
$$B^3 = b_3\alpha^9 + b_2\alpha^6 + b_1\alpha^3 + b_0$$
$$= (b_1+b_2+b_3+b_1b_3+b_2b_3)\alpha^3 + (b_2+b_0(b_1+b_2+b_3) +$$
$$b_1(b_2+b_3)+b_2b_3)\alpha^2 + (b_3+b_0(b_1+b_2)+b_2b_3)\alpha +$$
$$(b_0+b_1(b_2+b_3)+b_0b_2)$$
$$B^4 = b_3\alpha^{12} + b_2\alpha^8 + b_1\alpha^4 + b_0$$
$$= b_3\alpha^3 + (b_2+b_3)\alpha^2 + (b_1+b_3)\alpha + (b_0+b_1+b_2+b_3)$$

The equations indicate that addition is the cheapest operation in terms of hardware, and division is the most expensive operation. It is easier to determine the power of one element than the multiplication of two elements. The multiplication of an element with a constant is also less expensive than a standard multiplication.

Basic Encoder/Decoder Architecture

Let $u(X)=U_{k-1}X^{k-1}+ \ldots +U_1X+U_0$ denote the source word in polynomial notation. The encoder forms the code word:

$$c(X)=u(X) \cdot X^{n-k}+(u(X) \cdot X^{n-k} \bmod g(X)).$$

The generator polynomial g(X) of the RS [12, 8, 5] code over GF ($2^4$) is given by:

$$g(X) = (X+\alpha)(X+\alpha^2)(X+\alpha^3)(X+\alpha^4)$$
$$= X^4 + (\alpha^4+\alpha^3+\alpha^2+\alpha^1)X^3 + (\alpha^7+\alpha^6+\alpha^4+\alpha^3)X^2 +$$
$$(\alpha^9+\alpha^8+\alpha^7+\alpha^6)X + \alpha^{10}$$

-continued $$= X^4 + \alpha^{13}X^3 + \alpha^6 X^2 + \alpha^3 X + \alpha^{10}$$

Figure 3:
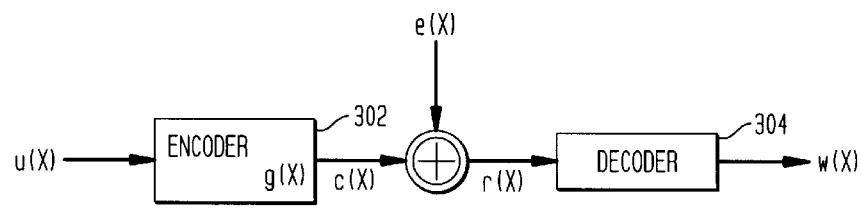
FIG. 3 shows a high-level block diagram of the encoder and decoder for the Reed-Solomon (RS) [12, 8, 5] code over Galois field (GF) ($2^4$)

Let r(X) be the received vector. The error vector is given by e(X)=r(X)−c(X). A high-level block diagram of the encoder (302) and decoder (304) is depicted in FIG. 3. The following subsections describe the operation of the encoder and decoder for the Reed-Solomon [12, 8, 5] code over GF ($2^4$) in detail.

Encoder Architecture

Figure 4:
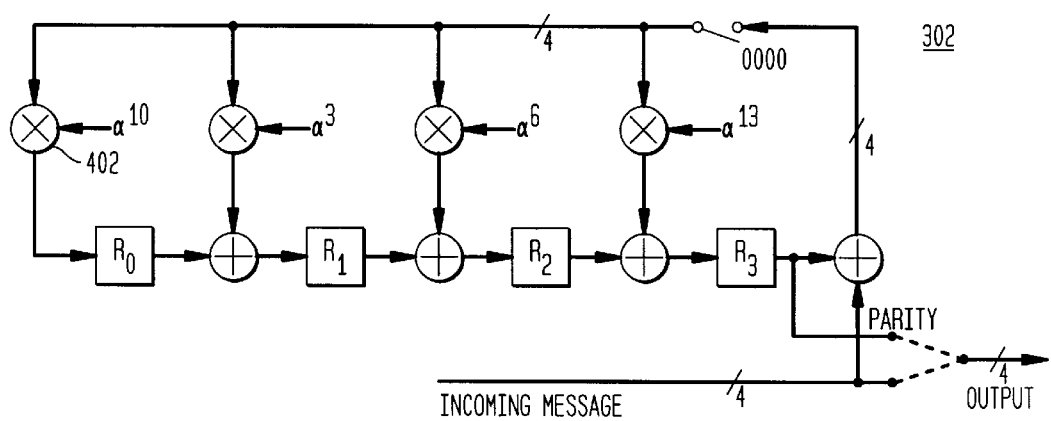
FIG. 4 shows a block diagram of the architecture of the encoder of FIG. 3 for the RS [12, 8, 5] code over GF ($2^4$)

The encoder determines $u(X) \cdot X^{n-k}$ mod g(X). This can be done serially by using a feedback shift register. The architecture of the encoder 302 is shown in FIG. 4. The registers $R_0$, $R_1$, $R_2$, and $R_3$ are 4-bit memory elements that are used to store the results of the intermediary computations. Let the value of register $R_j$ at time i be denoted by $R_j^{(i)}$. Initially, $R_j = R_j^{(0)} = 0$. After eight clock cycles, the registers contain the four parity check symbols, and the code word can be formed. Note that $C_j = R_j^{(8)}$ for $0 \leq j \leq 3$. It should be noted that the constant multipliers 402 in the encoder are much simpler than the standard multiplication.

It is possible to design an encoder that can perform two steps at the same time. Consider the following set of recursion relations:

$$R_0^{(i+2)} = (R_3^{(i)} + U_{k-i-1}) \cdot a^8 + (R_2^{(i)} + U_{k-i-2}) \cdot a^{10}$$

$$R_1^{(i+2)} = (R_3^{(i)} + U_{k-i-1}) \cdot a^8 + (R_2^{(i)} U_{k-i-2}) \cdot a^3$$

$$R_2^{(i+2)} = (R_3^{(i)} = U_{k-i-1}) \cdot a^7 + (R_2^{(i)} + U_{k-i-2}) \cdot a^6 + R_0^{(i)}$$

$$R_3^{(i+2)} = (R_3^{(i)} + U_{k-i-1}) \cdot a^1 + (R_2^{(i)} + U_{k-i-2}) \cdot a^{13} + R_1^{(i)}$$

In this set of recursion relations, the values $R_j^{(i)}$ do not have to be determined for odd i and therefore $R_j^{(8)}$ can be determined in four instead of eight clock cycles. Since the set of equations has a lot of common terms, the corresponding circuitry will have few logic gates and a small latency. In a similar fashion, it would be possible to derive a set of recursion relations where a larger number of steps can be performed in one clock cycle.

Decoder Architecture

The decoder (304 in FIG. 3) of the given RS [12, 8, 5] code over GF ($2^4$) is designed in such a way that it will be able to correct any combination of $f_r$ random errors and $f_e$ erasures, as long as $2f_r + f_e < 5$. Let $f_t = f_r + f_e$ denote the number of errors. The error vector e(X)=r(X)−c(X) can be written as:

$$e(X) = \sum_{i=1}^{f_t} E_{p_i} X^{p_i}$$

where $p_i$, $1 \leq i \leq f_t$, denotes the index of the error position of the i-th error.

The objective is to determine the error vector by using the syndrome values $S_1$ up to $S_4$, each of which is determined by:

$$S_j = r(\alpha^j) = c(\alpha^j) + e(\alpha^j) = \sum_{i=1}^{f_t} (E_{p_i}(\alpha^j))^{p_i} = \sum_{i=1}^{f_t} V_i P_i^j$$

where $V_i = E_{p_i}$ represents the error value at position $p_i$ and $P_i = a^{P_i}$ denotes the index of the error position in exponential notation. It is more convenient to index the error position by the field element $P_i = a^{p_i}$ than by the integer $p_i$. There is a one-to-one map between $p_i$ and $a^{p_i}$ and therefore the two representations are equivalent.

The value of $f_t$, the maximum number of correctable errors, is equal to $d_{min} - 1 = n - k$. If there are $f_e$ erasures, it is possible to correct $f_r$ additional random errors, as long as $f_r \leq (d_{min} - f_e - 1)/2$. This requires a set of $f_t = f_e + f_r/2$ equations to be solved.

Figure 5:
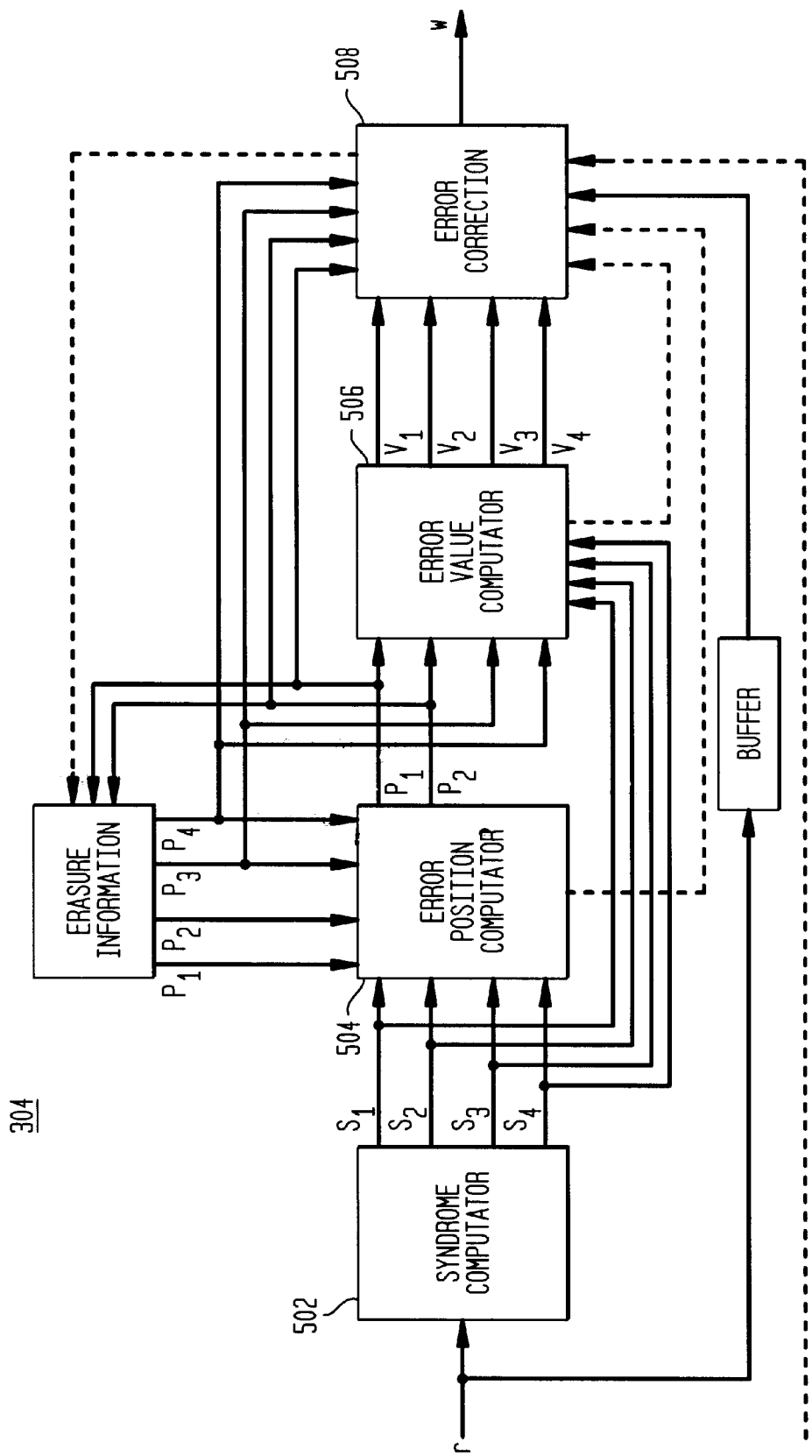
FIG. 5 shows a block diagram of the architecture of the decoder of FIG. 3 for the RS [12, 8, 5] code over GF ($2^4$)

The architecture of the decoder 304 of the given RS [12, 8, 5] code over GF ($2^4$) is shown in FIG. 5. The decoder has four modules corresponding to four stages of processing. In the first stage, syndrome computator (i.e., calculator) 502 determines the syndrome values. In the second stage, error position computator 504 determines the error positions, and, in the third stage, error value computator 506 determines the corresponding error values. If the computed parameters are consistent, error correction module 508 corrects the errors, if any, in the fourth stage.

Syndrome Computation

The first step in the decoder is to determine the syndromes $S_1$, $S_2$, $S_3$, and $S_4$ for the given received vector r(X). The syndrome $S_j$ is determined by evaluating:

$$S_j = r(\alpha^j) = \sum_{i=0}^{n-1} R_i \cdot \alpha^{i \cdot j}$$

Let $S_j^{(0)} = R_{n-1}$ and $S_j^{(i)} = a^j \cdot S_j^{(i-1)} + R_{n-i-1}$. It is easy to verify that $S_j = S_j^{(n-1)}$. This implies that the four syndromes $S_1$, $S_2$, $S_3$, and $S_4$ can be computed in n consecutive steps. The underlying basic operations for the syndrome computation are $a \cdot B$, $a^2 \cdot B$, $a^3 \cdot B$, and $a^4 \cdot B$, where $B = (b_3, b_2, b_1, b_3)$, equivalently represented by $B = b_3 a^3 + b_2 a^2 + b_1 a^1 + b_0$, is an arbitrary element of GF ($2^4$). The following set of expressions are obtained:

$$a^1 \cdot B = b_3 \alpha^4 + b_2 \alpha^3 + b_1 \alpha^2 + b_0 \alpha^1$$

$$= b_2 \alpha^3 + b_1 \alpha^2 + (b_0 + b_3)\alpha^1 + b_3$$

$$a^2 \cdot B = b_2 \alpha^4 + b_1 \alpha^3 + (b_0 + b_3)\alpha^2 + b_3 \alpha$$

$$= b_1 \alpha^3 + (b_0 + b_3)\alpha^2 + (b_2 + b_3)\alpha^1 + b_2$$

$$a^3 \cdot B = b_1 \alpha^4 + (b_0 + b_3)\alpha^3 + (b_2 + b_3)\alpha^2 + b_2 \alpha$$

$$= (b_0 + b_3)\alpha^3 + (b_2 + b_3)\alpha^2 + (b_1 + b_2)\alpha^1 + b_1$$

$$a^4 \cdot B = (b_0 + b_3)\alpha^4 + (b_2 + b_3)\alpha^3 + (b_1 + b_2)\alpha^2 + b_1 \alpha^1$$

$$= (b_2 + b_3)\alpha^3 + (b_1 + b_2)\alpha^2 + (b_0 + b_1 + b_3)\alpha^1 + (b_0 + b_3)$$

Figure 6:
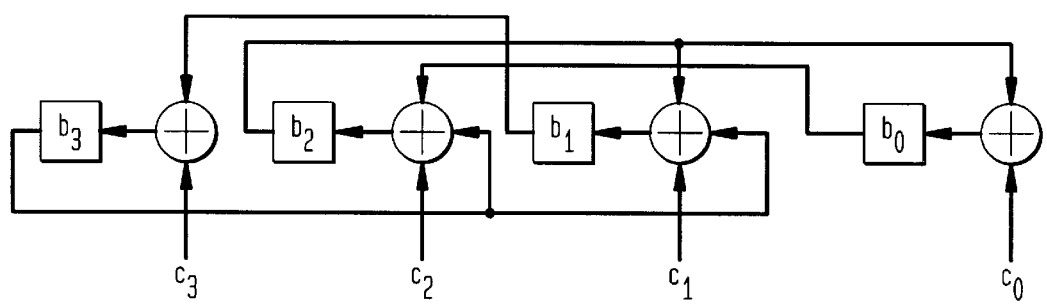
FIGS. 6–9 show block diagrams of the four circuits used to compute the four syndromes for decoding the RS[12, 8, 5] code over GF ($2^4$)
Figure 7:
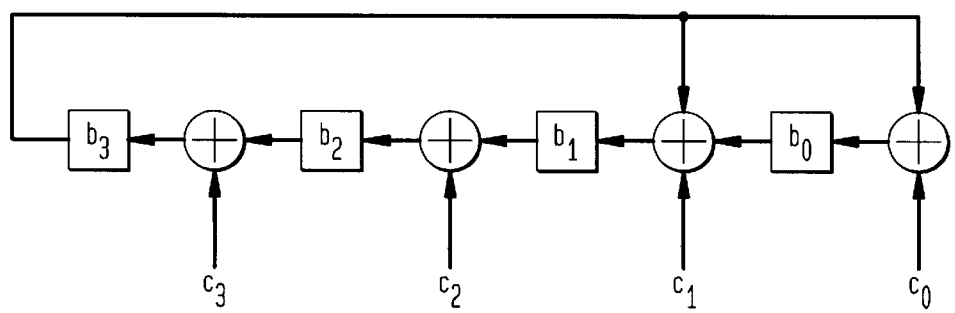
Figure 8:
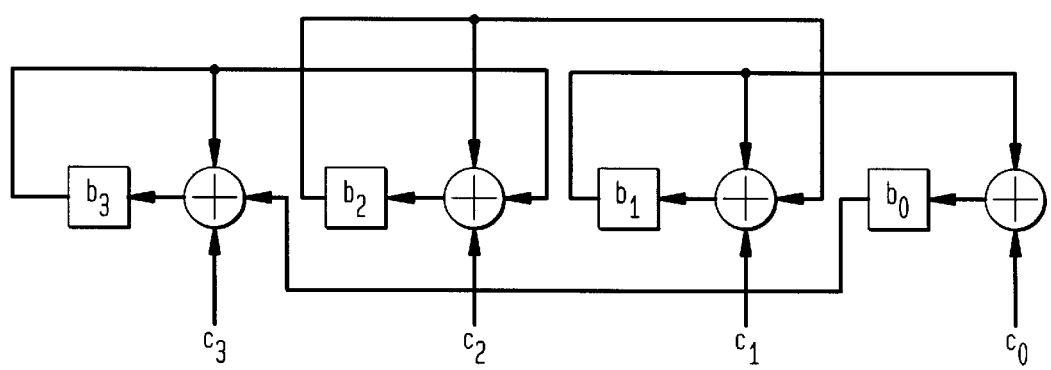
Figure 9:
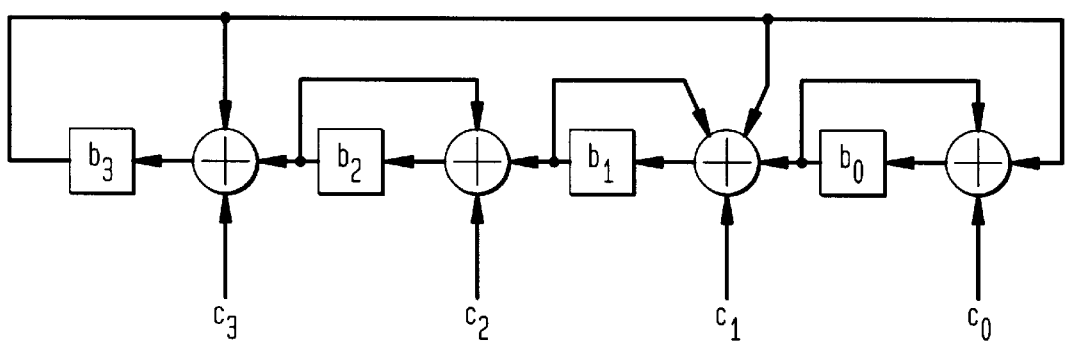

A straightforward implementation of these equations leads to the syndrome-forming circuits shown in FIGS. 6–9. FIG. 6 shows circuitry used to compute syndrome $S_1^{(i)} = a \cdot B + C$, where $B = S_1^{(i-1)}$ and $C = R_{n-i-1}$. FIG. 7 shows circuitry used to compute syndrome $S_2^{(i)} a^2 \cdot B + C$, where $B = S_2^{(i-1)}$ and $C = R_{n-i-1}$. FIG. 8 shows circuitry used to compute syndrome $S_3^{(i)} = a^3 \cdot B + C$, where $B = S_3^{(i-1)}$ and $C = R_{n-i-1}$. FIG. 9 shows circuitry used to compute syndrome $S_4^{(i)} = a^4 \cdot B + C$, where $B = S_4^{(i-1)}$ and $C = R_{n-i-1}$.

The syndrome $S_1$ satisfies the recursion relation $S_1^{(i)} = a \cdot S_1^{(i-1)} + R_{n-i-1}$. The syndrome can be determined in fewer steps by expanding the recursion:

$$S_j^{(i)} = \alpha^j \cdot S_j^{(i-1)} + R_{n-i-1}$$

$$= \alpha^j \cdot (\alpha^j \cdot S_j^{(i-2)} + R_{n-i-2}) + R_{n-i-1}$$

$$= \alpha^j \cdot (\alpha^j \cdot (\alpha^j \cdot S_j^{(i-3)} + R_{n-i-3}) + R_{n-i-2}) + R_{n-i-1}$$

$$= \alpha^{3j} \cdot S_j^{(i-3)} + \alpha^{2j} \cdot R_{n-i-3} + \alpha^j \cdot R_{n-i-2} + R_{n-i-1}$$

In this recursion relation, the values $S_j^{(12)}$ can be determined in four steps instead of twelve steps. Let $S'_j = S_j^{(i)}$ and $S_j = S_j^{(i-3)}$, and let C, B, and A denote the received values $R_{n-i-1}$, $R_{n-i-2}$, and $R_{n-i-1}$, respectively. We now obtain $S'_j = S_j \cdot a^{3j} + C \cdot a^{2j} + B \cdot a^j + A$. The recursion relations for $S_1$, $S_2$, $S_3$, and $S_4$ can now be rewritten to:

$$S'_1 = S_1 \cdot \alpha^3 + C \cdot \alpha^2 + B \cdot \alpha^1 + A$$

$$= \begin{bmatrix} s'_0 \\ s'_1 \\ s'_2 \\ s'_3 \end{bmatrix} = \begin{bmatrix} s_1 + a_0 + b_3 + c_2 \\ s_1 + s_2 + a_1 + b_0 + b_3 + c_2 + c_3 \\ s_2 + s_3 + a_2 + b_1 + c_0 + c_3 \\ s_0 + s_3 + a_3 + b_2 + c_1 \end{bmatrix}$$

$$S'_2 = S_2 \cdot \alpha^6 + C \cdot \alpha^4 + B \cdot \alpha^2 + A$$

$$= \begin{bmatrix} s'_0 \\ s'_1 \\ s'_2 \\ s'_3 \end{bmatrix} = \begin{bmatrix} s_1 + s_2 + a_0 + b_2 + c_0 + c_3 \\ s_1 + s_3 + a_1 + b_2 + b_3 + c_0 + c_1 + c_3 \\ s_0 + s_2 + a_2 + b_0 + b_3 + c_1 + c_2 \\ s_0 + s_1 + s_3 + a_3 + b_1 + c_2 + c_3 \end{bmatrix}$$

$$S'_3 = S_3 \cdot \alpha^9 + C \cdot \alpha^6 + B \cdot \alpha^3 + A$$

$$= \begin{bmatrix} s'_0 \\ s'_1 \\ s'_2 \\ s'_3 \end{bmatrix} = \begin{bmatrix} s_1 + s_3 + a_0 + b_1 + c_1 + c_2 \\ s_0 + s_1 + s_2 + s_3 + a_1 + b_1 + b_2 + c_1 + c_3 \\ s_1 + s_2 + s_3 + a_2 + b_2 + b_3 + c_0 + c_2 \\ s_0 + s_2 + s_3 + a_3 + b_0 + b_3 + c_0 + c_1 + c_3 \end{bmatrix}$$

$$S'_4 = S_4 \cdot \alpha^{12} + C \cdot \alpha^8 + B \cdot \alpha^4 + A$$

$$= \begin{bmatrix} s'_0 \\ s'_1 \\ s'_2 \\ s'_3 \end{bmatrix} = \begin{bmatrix} s_0 + s_1 + s_2 + s_3 + a_0 + b_0 + b_3 + c_0 + c_2 \\ s_0 + a_1 + b_0 + b_1 + b_3 + c_1 + c_2 + c_3 \\ s_0 + s_1 + a_2 + b_1 + b_2 + c_0 + c_2 + c_3 \\ s_0 + s_1 + s_2 + a_3 + b_2 + b_3 + c_1 + c_3 \end{bmatrix}$$

Since the equations have a lot of common terms, the corresponding optimized circuitry will have few logic gates and a small latency.

Error Position Computation

The number of erasures, $f_e$, as well as the position of the erasures, if any, should be known to the decoder at this point. Depending on the actual number of erasures, a set of equations that has to be solved can be written. Recall that the syndromes are given by:

$$S''_i = \sum_{j=1}^{f_t} P_j^i \cdot V_j$$

where $P_j$ is the exponential representation of the error location and $V_j$ is the error value at this location. The value of $f_t$, the maximum number of correctable errors, is equal to $d_{min} - 1 = n - k$. If there are $f_e$ erasures and $f_r \leq (d_{min} - f_e - 1)/2$ random errors, a set of $f_t = f_e + f_r/2$ equations has to be solved. If there are $f_e$ erasures, the values $P_j$ are zero for $1 \leq j \leq f_e$. For $4 - f_e + 1 \leq j \leq 4$, the values $P_j$ are supposed to be non-zero, different, and in the range $a^0 \ldots a^{11}$. The value $f_e$ can be easily recovered, because it equals the maximum value of j for which $P_j = 0$. Consider the following situations:

Case A:
If $S_1 = S_2 = S_3 = S_4 = 0$, then there is no error, and $P_1 = P_2 = P_3 = P_4 = 0$.

Case B:
Otherwise, if $f_e = 0$ and $S_1 S_3 \neq S_2^2$, then there are two random errors ($f_r = 2$). Let $K = (k_3, k_2, k_1, k_0)$ denote an auxiliary variable defined by:

$$K = \frac{(S_2 S_4 + S_3^2)(S_1 S_3 + S_2^2)}{(S_1 S_4 + S_2 S_3)^2}$$

If $k_3 = 1$, then an uncorrectable error occurred and an error flag will be raised. If, on the other hand, $k_3 = 0$, then there are two errors at the positions $P_1$ and $P_2$, given by:

$$P_1 + \frac{S_1 S_4 + S_2 S_3}{S_1 S_3 + S_2^2} Q \quad \text{and}$$

$$P_2 = P_1 + \frac{S_1 S_4 + S_2 S_3}{S_1 S_3 + S_2^2}$$

where $$Q = (q_3, q_2, q_1, q_0) = (k_1 + k_2, k_0, k_0 + k_1, 0).$$

If $P_1$ or $P_2$ is not a valid position, an error flag will be raised.

Case C:
Otherwise, if $0 \leq f_e \leq 2$, there is, if $P_3(P_4 S_1 + S_2) \neq P_4 S_2 + S_3$, one random error at the position:

$$P_2 = \frac{P_3(P_4 S_2 + S_3) + P_4 S_3 + S_4}{P_3(P_4 S_1 + S_2) + P_4 S_2 + S_3}$$

and $P_1 = 0$. If $P_2$ is not a valid position, or if $P_3(P_4 S_1 + S_2) = P_4 S_2 + S_3$, an error flag will be raised.

Case D:
Otherwise, if $3 \leq f_e \leq 4$, it is not possible to correct any additional random errors.

Computation of the error positions probably requires at most three clock cycles. This would make it possible to pipeline the different stages of the decoder (e.g., using three clock cycles per stage) and to consequently reduce the number of decoders.

Verification of the Solution

If the error correcting capabilities are exceeded, i.e., whenever $f_r = 2f_r + f_e \geq d_{min}$, it will often be possible to detect the errors and to raise a flag. Once the error positions and the corresponding error values have been computed, the consistency of the solution can be easily checked by recomputing the syndrome values using the following four equations:

$$S''_i = \sum_{j=1}^{f_t} P_j^i \cdot V_j$$

and compare these values with the original syndromes. If there is a mismatch, a flag will be raised to indicate that an uncorrectable error occurred.

In addition, the error positions $P_i$ have to correspond to error indices $p_i$ in the range $0 \leq p_i \leq 11$ since the code has length 12. This excludes the $P_i$ values $a^{12}$, $a^{13}$, and $a^{14}$. Let $(C_3, C_2, C_1, C_0)$ denote the binary representation of a given $P_r$. Then $P_i$ is in the proper range if and only if $c_0$ AND $c_3$ AND ((NOT $c_1$) OR $c_2$) = 0.

Error Value Computation

After having determined the location of the errors, the corresponding error values $V_1$, $V_2$, $V_3$, $V_4$ can be computed using the following expressions:

$$V_1 = \frac{P_2(P_3(P_4S_1 + S_2) + (P_4S_2 + S_3)) + P_3(P_4S_2 + S_3) + (P_4S_3 + S_4)}{P_1(P_1 + P_2)(P_1 + P_3)(P_1 + P_4)}$$

$$V_2 = \frac{P_3(P_4S_1 + S_2) + (P_4S_2 + S_3) + P_1(P_1 + P_3)(P_1 + P_4)V_1}{P_2(P_2 + P_3)(P_2 + P_4)}$$

$$V_3 = \frac{P_4S_1 + S_2 + P_1(P_1 + P_4)V_1 + P_2(P_2 + P_4)V_2}{P_3(P_3 + P_4)}$$

$$V_4 = \frac{S_1 + P_1V_1 + P_2V_2 + P_3V_3}{P_4}$$

This method requires the consecutive computation of $V_1$ up to $V_4$. Alternatively, one can use the following set of expressions to determine the values of $V_1$ to $V_4$ independently and in parallel:

$$V_1 = \frac{P_2(P_3(P_4S_1 + S_2) + (P_4S_2 + S_3)) + P_3(P_4S_2 + S_3) + (P_4S_3 + S_4)}{P_1(P_1 + P_2)(P_1 + P_3)(P_1 + P_4)}$$

$$V_2 = \frac{P_1(P_3(P_4S_1 + S_2) + (P_4S_2 + S_3)) + P_3(P_4S_2 + S_3) + (P_4S_3 + S_4)}{P_2(P_2 + P_1)(P_2 + P_3)(P_2 + P_4)}$$

$$V_3 = \frac{P_4(P_2(P_1S_1 + S_2) + (P_1S_2 + S_3)) + P_2(P_1S_2 + S_3) + (P_1S_3 + S_4)}{P_3(P_1 + P_3)(P_2 + P_3)(P_3 + P_4)}$$

$$V_4 = \frac{P_3(P_2(P_1S_1 + S_2) + (P_1S_2 + S_3)) + P_2(P_1S_2 + S_3) + (P_1S_3 + S_4)}{P_4(P_1 + P_4)(P_2 + P_4)(P_3 + P_4)}$$

The expressions for $V_1$ and $V_2$, and for $V_3$ and $V_4$ are similar. This can be exploited to reduce the number of operations required for the actual computation. It should be possible to evaluate these expressions in three or even fewer clock cycles.

Error Correction

Figure 10:
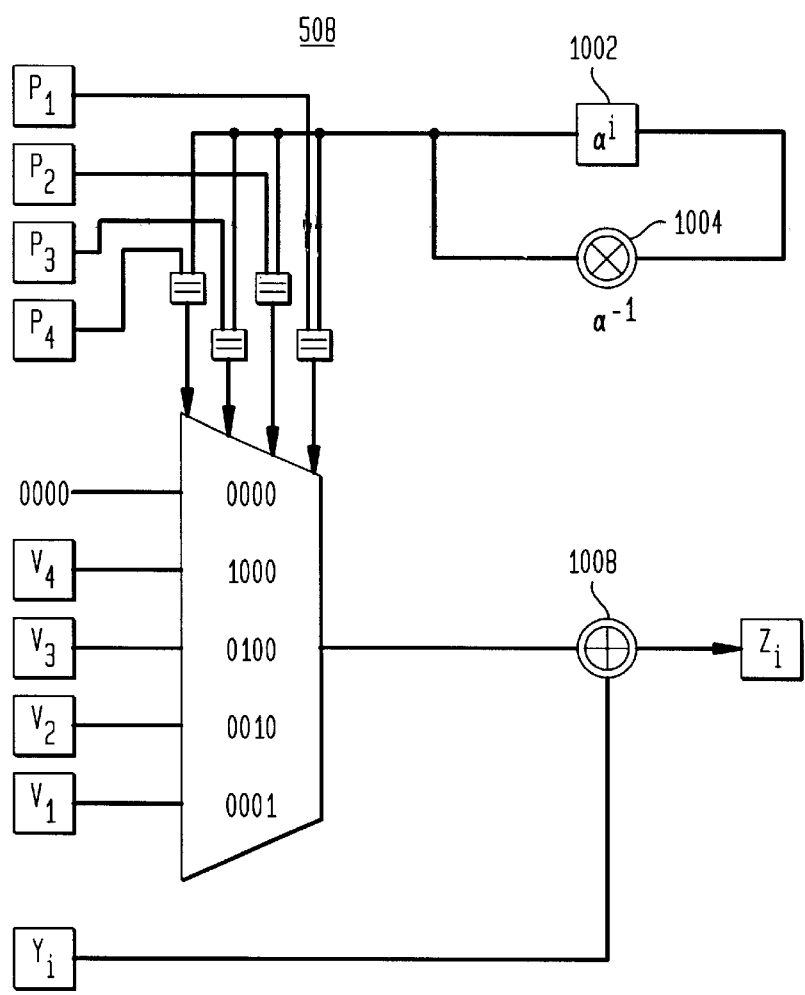
FIG. 10 shows a block diagram of the architecture of the error correction module of FIG. 5.

After having determined the error positions and the corresponding error values, the errors can be corrected at the output of the decoder, provided that the solution is consistent. This is not the case whenever an error flag is raised in one of the paired decoders. In this situation, the error correction unit indicates that an uncorrectable error occurred and disables error correction to avoid the introduction of additional errors. If the decoder does not detect any inconsistencies, the corrected word w is guaranteed to be a codeword, and whenever the error correcting capabilities have not been exceeded, w=u. One architecture for the error correction module 508 is shown in FIG. 10.

The register 1002 that contains $a^i$ is initialized with $a^{11}=1110$. Register 1002 is updated by multiplying the contents of the register 1004 with $a^{-1}$. The equation $B \cdot a^{-1}$, where $B=(b_3, b_2, b_1, b_0)$, equivalently represented by $B=b_3a^3+b_2a^2+b_1a_1+b_0$, is an arbitrary element of GF $(2^4)$, can be easily rewritten to:

$$\alpha^{-1} \cdot B = b_3\alpha^2 + b_2\alpha^1 + b_1\alpha^0 + b_0\alpha^{-1}$$

$$= b_3\alpha^2 + b_2\alpha^1 + b_1\alpha^0 + b_0\alpha^{14}$$

$$= b_0\alpha^3 + b_3\alpha^2 + b_2\alpha + (b_0 + b_1)$$

The position values $P_j$ are compared (at elements 1006) with $a_i$. Since $P_j=a^{P_j}$, the error value $V_j$ will be added (at 1008) to the received symbol $Y_i$, if and only if $i=p_j$. The circuit would need eight clock cycles to correct the eight information symbols. It is possible to modify the circuit to perform two or more steps within one clock cycle.

Figure 11:
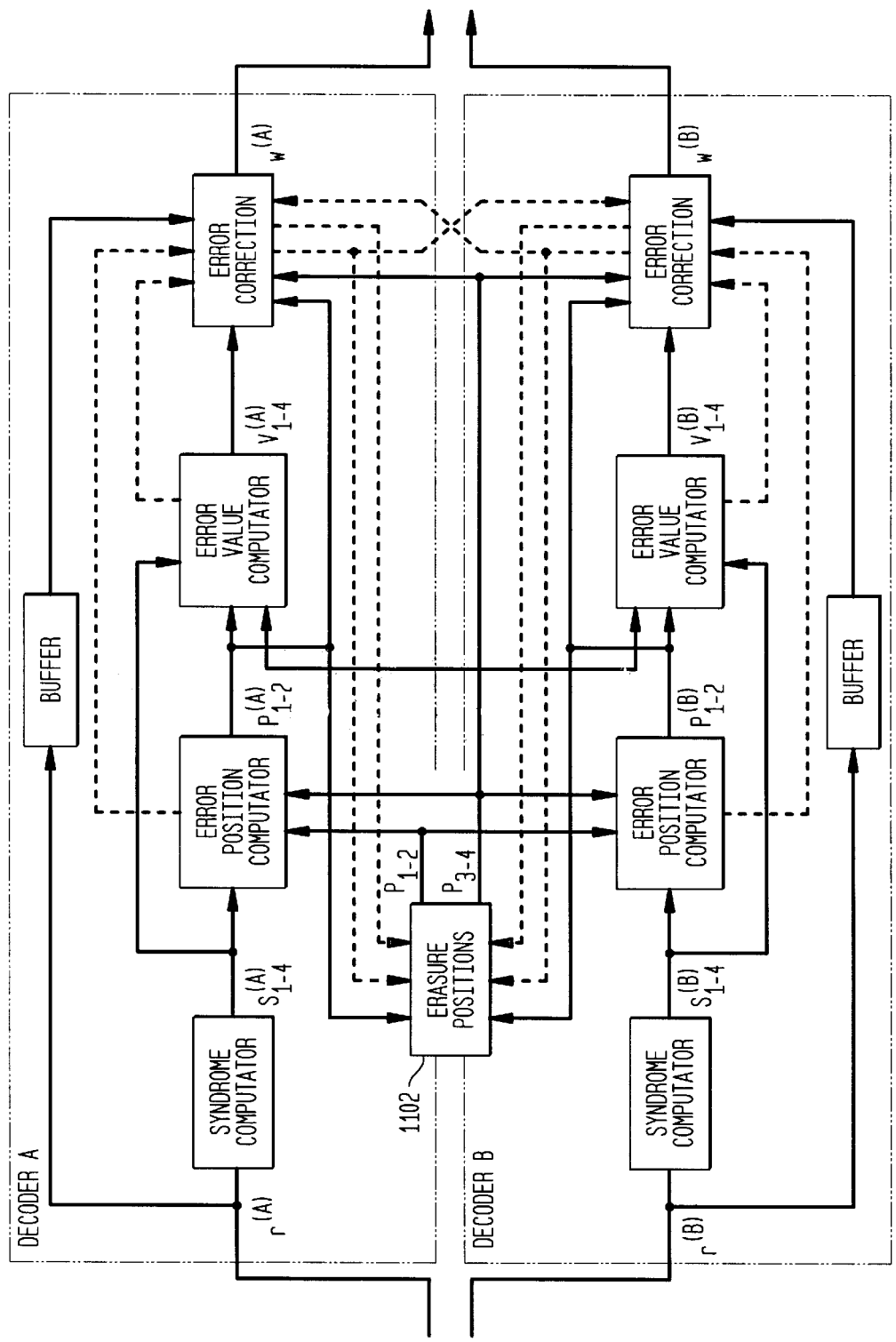
FIG. 11 shows a block diagram of one possible architecture of two paired decoders.

One possible architecture of the two paired decoders is depicted in FIG. 11. The two decoders (A and B) exchange information about the consistency of the solution. In addition, both decoders return the newly computed error positions $P_1$ and $P_2$ to the erasure position module 1102 to update the erasure positions. In addition, a four-bit control signal is returned which indicates at which positions $P_i$ the values $V_i$ are non-zero. This information can be used to declare positions to become erasures and to continue to treat these positions as erasures as long as errors occur regularly at these positions. In FIG. 11, the dashed lines represent the control signals which indicate whether or not inconsistencies have been detected. The dash-dotted lines represent the four-bit control signals.

Exemplary Switch

This section describes a particular implementation of the present invention for a 1024×1024 switch supporting up to 1024 incoming and outgoing OC-48 data signals. An OC-48 data signal is an optical signal corresponding to the SONET STS-48 data format transmitted at a rate of 2.488 gigabits/second (Gb/s).

Figure 12:
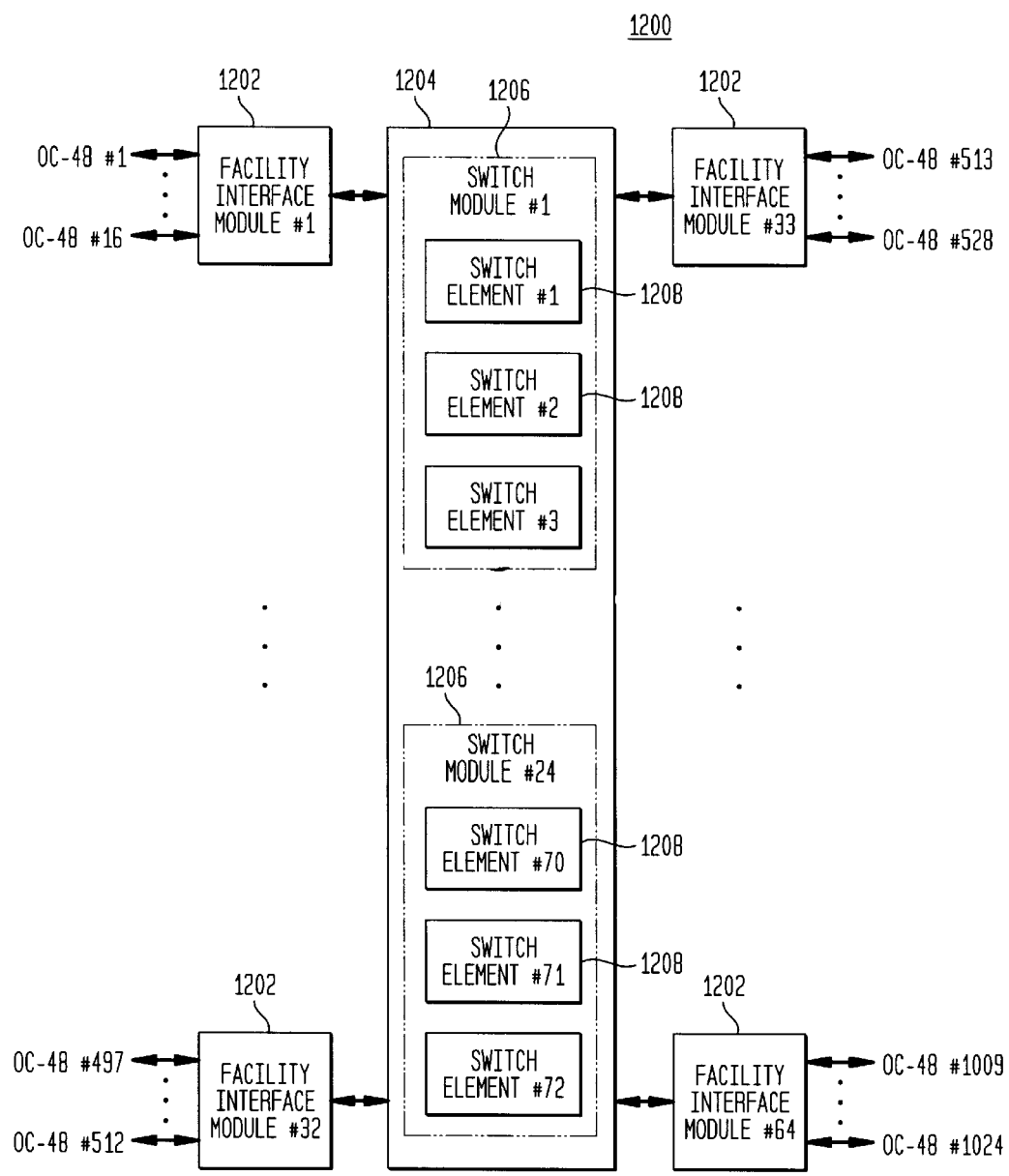
FIG. 12 shows a high-level block diagram of a 1024×1024 switch, according to one embodiment of the present invention.

FIG. 12 shows a high-level block diagram of a 1024×1024 switch 1200, according to one embodiment of the present invention. Switch 1200 comprises 64 facility interface (FI) modules 1202 optically coupled to a 1024×1024 distributed synchronous switch fabric 1204 comprising 24 switch modules 1206, each comprising three switch elements 1208 for a total of 72 switch elements 1208 in switch fabric 1204. Each of the 64 FI modules 1202 handles 16 incoming and outgoing OC-48 signals for a total of 1024 incoming and outgoing OC-48 signals. Each switch element 1208 switches the same corresponding slice of data for each of the 1024 STS-48 signals.

The fault tolerance management technique for switch 1200 provides error-less transmission in the event of covered equipment failures in the transmission path starting at the encoder and ending at the decoder by employing the Reed-Solomon [12,8,5] code over GF $(2^4)$. In this scheme, a Reed-Solomon encoder located in an FI module 1202 generates code symbols based on the information symbols. Encoding is systematic and therefore information symbols are not altered. In switch 1200, the information symbols and the error-correcting code symbols are transported on separate communication channels to minimize the number of symbols affected by equipment failure(s) and support error-less transmission. Referring to FIG. 12, 48 switch elements 1208 are used to route information symbols, while 24 switch elements are used to route code symbols. In the egress (i.e., outgoing) direction, each decoder in an FI module 1202 detects and corrects error(s) based on the routed information and code symbols. Note that information and code symbols traverse through physically diverse cable and switch elements before arriving at a decoder. In the event of failure of any switch element 1208 and/or associated switch module 1206, the associated symbols will be either errored or completely lost. However, if the number of errored symbols does not exceed the error-correcting capability of the RS [12, 8, 5] code, the decoder is able to recompute the lost information or code symbol based on the remaining un-errored information and code symbols to provide error-less transmission. In that case, since each decoder continuously checks for errors and corrects errors, there will be no transmission errors.

Figure 13:
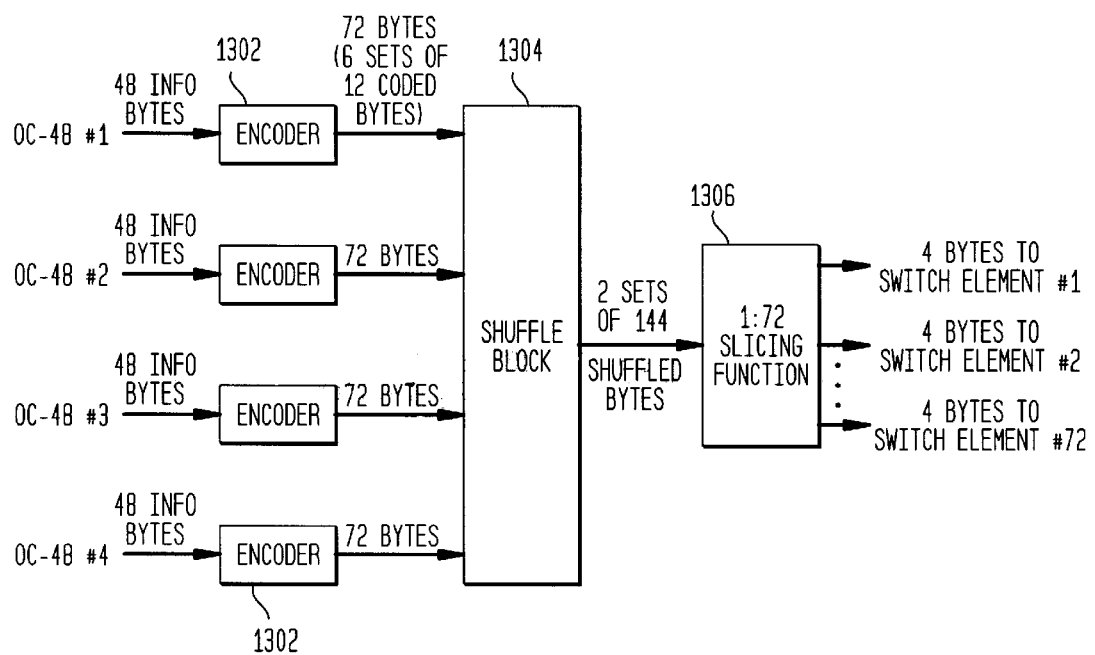
FIG. 13 shows a block diagram of the processing performed at the input side of the switch of FIG. 12 for each set of four incoming OC-48 data signals.

FIG. 13 shows a block diagram of the processing performed at the input side of switch 1200 of FIG. 12 for each set of four incoming OC-48 data signals. As shown in FIG. 13, for each set of four incoming OC-48 data signals, there are four encoders 1302, a shuffle block 1304, and a 1:72 slicing function 1306. Each encoder 1302 generates 72 bytes of encoded data for every 48 information bytes in the corresponding OC-48 data signal. Shuffle block 1304 shuffles the 72 bytes of encoded data for all four encoders 1302 to output two sets of 144 bytes. Slicing function 1306 slices the resulting shuffled data to distribute four bytes of data (one corresponding byte from each of the four incoming OC-48s) to each of the 72 switch elements 1208 of FIG. 12. In one embodiment of switch 1200, 1:72 slicing function 1306 is implemented using a 1:24 slicer that is part of an FI module 1202 followed by a 1:3 final slicer that is part of switch fabric 1204.

Figure 14:
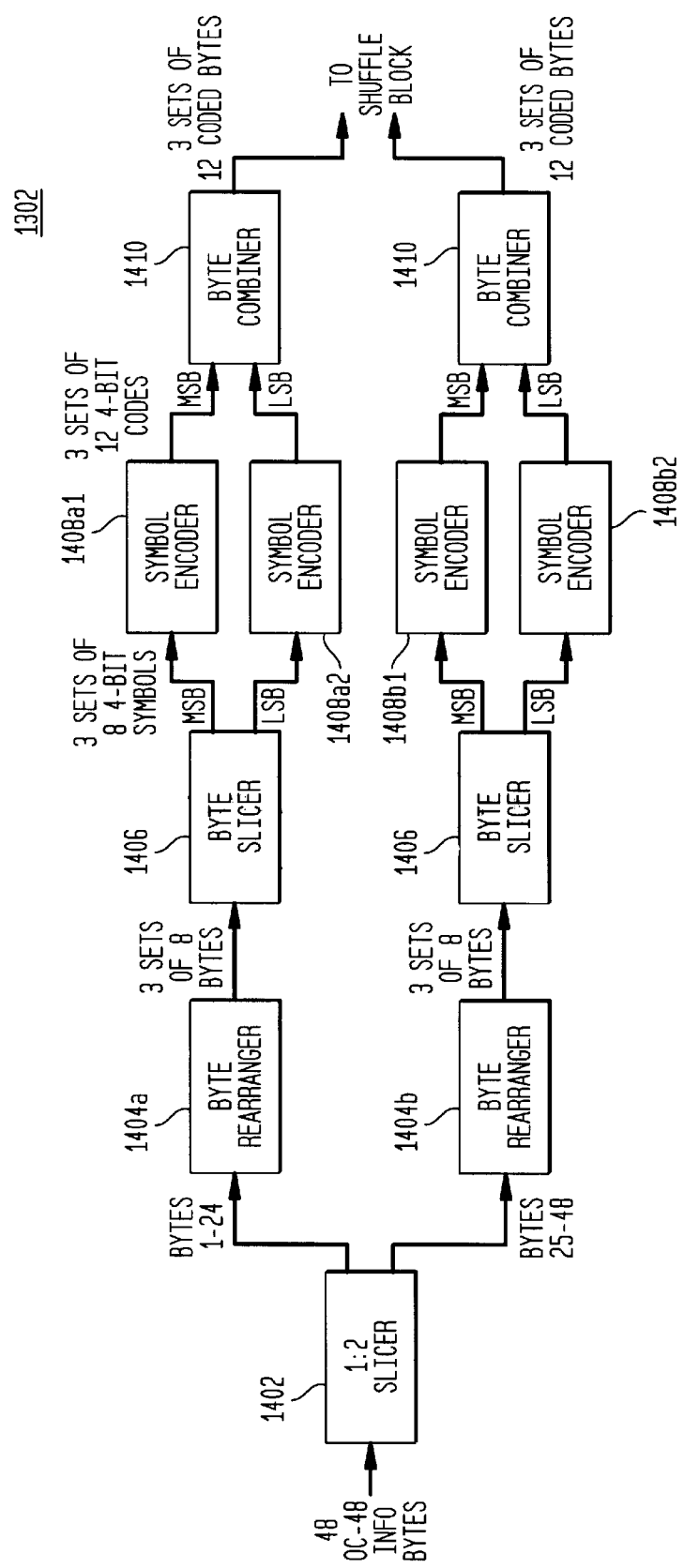
FIG. 14 shows a block diagram of the processing performed by each encoder of FIG. 13 for the corresponding incoming OC-48 data signal.

FIG. 14 and Table 2 illustrate the processing performed by each encoder 1302 of FIG. 13 for the corresponding incoming OC-48 data signal. Note that the SONET (synchronous optical network) convention of numbering the 48 consecutive serial bytes in STS-48 as {1, 4, 7, 10, 13, 16, 19, 22, 25, 28, 31, 34, 37, 40, 43, 46, 2, 5, 8, 11, 14, 17, 20, 23, 26, 29, 32, 35, 38, 41, 44, 47, 3, 6, 9, 12, 15, 18, 21, 24, 27, 30, 33, 36, 39, 42, 45, 48} is used. As shown in FIG. 14, 1:2 slicer 1402 slices each set of 48 information bytes from the OC-48 data signal into two groups: group a consisting of bytes 1–24 and group b consisting of bytes 25–48. Byte rearranger 1404a rearranges bytes 1–24 into three 8-byte sets, where, as shown in Table 2, Set 1 consists of information bytes {1, 4, 7, 10, 13, 16, 19, 22}, Set 2 consists of bytes {2, 5, 8, 11, 14, 17, 20, 23}, and Set 3 consists of bytes {3, 6, 9, 12, 15, 18, 21, 24}. Similarly, byte rearranger 1404b rearranges bytes 25–48 into Sets 4, 5, and 6.

Each set of eight rearranged information bytes is then byte sliced by a corresponding byte slicer 1406 into two blocks of eight 4-bit information symbols: one eight-symbol block corresponding to the four most significant bits (MSBs) from each rearranged information byte and one eight-symbol block corresponding to the four least significant bits (LSBs) from each rearranged information byte. Each block of eight 4-bit information symbols are then encoded by a corresponding symbol encoder 1408, which applies the RS [12, 8, 5] code over GF ($2^4$) described in the previous section, to generate a set of twelve 4-bit encoded symbols, where eight of the 4-bit encoded symbols correspond to the original eight information symbols and the remaining four 4-bit encoded symbols corresponds to four code symbols generated according to the RS [12, 8, 5] code over GF ($2^4$). FIG. 4 shows one possible implementation for each symbol encoder 1408.

Each corresponding pair of MSB and LSB sets of twelve 4-bit encoded symbols are then combined by an appropriate byte combiner 1410 to form a corresponding set of 12 bytes of encoded data, which are then provided to shuffle block 1304 of FIG. 13. For example, as shown in Table 2, code bytes C1, C16, C7, and C22 are generated for the first set of 8 rearranged information bytes generated by byte rearranger 1404a, to form one 12-byte set of encoded data, and similarly for the other five sets of eight rearranged information bytes shown in Table 2. As such, each encoder 1302 in FIG. 13 generates six sets of 12 bytes (or 72 bytes total) of encoded data for every set of 48 information bytes from the corresponding OC-48 data signal.

Referring again to FIG. 13, shuffle block 1304 contains two blocks (not shown). The first block shuffles the first set of 36 bytes of encoded data generated by each of the four encoders 1302 to generate a first set of 144 shuffled, encoded bytes. Similarly, the second block shuffles the second set of 36 bytes of encoded data generated by each of the four encoders 1302 to generate a second set of 144 shuffled, encoded bytes.

Figures 15A, 15B, 15C:
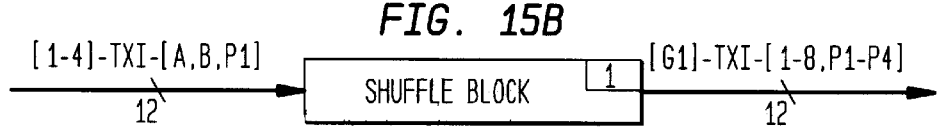
FIGS. 15A–C indicate the shuffle processing performed by the shuffle block of FIG. 13 for the 36 bytes of encoded data corresponding to the first 24 information bytes from each of the four OC-48 data streams.

FIGS. 15A–C indicate the processing performed by shuffle block 1304 of FIG. 13 for the 36 bytes of coded data corresponding to the first 24 bytes from each of the four OC-48 data streams. FIG. 15A shows 12×12 matrix of addresses identifying the order of the bytes of encoded data provided to shuffle block 1304, where the first number in each address identifies the OC-48 data signal and the second number identifies the byte of encoded data as listed in Table 2. Thus, the first three rows in FIG. 15A correspond to OC-48#1, the second three rows correspond to OC-48#2, etc. Similarly, FIG. 15C shows a 12×12 matrix of addresses identifying the order of the bytes of shuffled data generated by shuffle block 1304. As shown in FIG. 15C, shuffle block 1304 reorders the encoded data such that data bytes 1–3 for all four OC-48 data signals appear in the first row, data bytes 4–6 for all four OC-48 data signals appear in the second row, code bytes C1–C3 for all four OC-48 data signals appear in the third row, etc.

Referring again to FIG. 13, 1:72 slicing function 1306 slices the two sets of 144 shuffled bytes of encoded data generated by shuffle block 1304 to distribute the encoded data to the 72 switch elements 1208 of FIG. 12 such that each switch element 1208 receives the same corresponding byte of code data for each of the 1024 OC-48 data signals. That is, one switch element 1208 in FIG. 12 receives data byte 1 for all 1024 OC-48 data signals, another switch element 1208 receives data byte 2 for all 1024 OC-48 data signals, yet another switch element 1208 receives code byte C1 for all 1024 OC-48 data signals, etc.

As shown in FIG. 12, in one implementation of the present invention, switch fabric 1204 comprises 24 switch modules 1206, each having three switch elements 1208. In this implementation, the 1:72 slicing can be implemented in two steps: a 1:24 slicing operation within each FI module 1202, following by a corresponding further 1:3 slicing operation within switch fabric 1204. According to one particular implementation, shuffle block 1304 performs a shuffling of data. For example, as shown in FIG. 15C, the seventh row identifies the order of the corresponding shuffled bytes of encoded data as byte 15 for all four OC-48 signals, followed by byte 13 for all four OC-48 signals, followed by byte 14 for all four OC-48 signals (instead of the "expected" order of byte 13, followed by byte 14, followed by byte 15). Similarly, the data in the sixth, eighth, tenth, eleventh, and twelfth rows of FIG. 15C also show such shuffling of data.

This shuffling distributes the encoded bytes over the 72 switch elements in such a way as to enable error correction to be performed to provide errorless transmission even when as many as six of the 24 different switch modules 1206 are not functioning properly, either because of random errors, catastrophic failures, or just routine maintenance. The shuffling shown in FIG. 15C ensures that no more than two bytes in any information block are affected in the event of two switch element failures. This means that, for the distributed switch fabric 1204 of FIG. 12, as many as six different switch modules 1206 with their 18 different switch elements 1208 can be out of service, and switch 1200 will still provide errorless switching for all 1024 OC-48 data signals.

Figure 16:
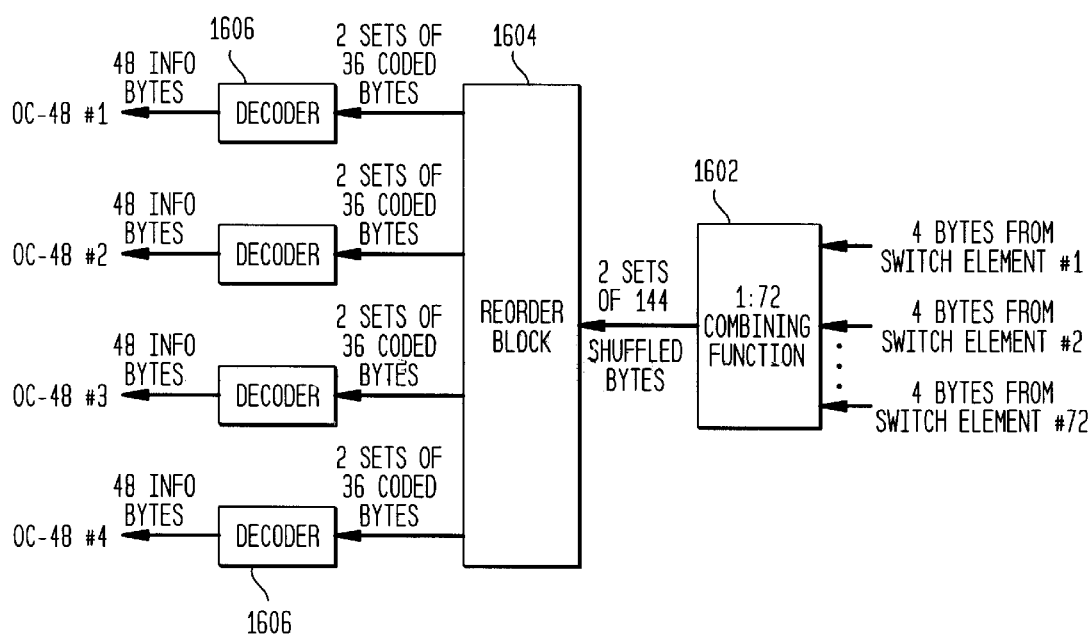
FIG. 16 shows a block diagram of the processing performed at the output side of the switch of FIG. 12 for each set of four routed, outgoing OC-48 data signals.

FIG. 16 shows a block diagram of the processing performed at the output side of switch 1200 of FIG. 12 for each set of four outgoing OC-48 data signals. As shown in FIG. 16, for each set of four outgoing OC-48 data signals, there are a 72:1 combining function 1602, a reorder block 1604, and four decoders 1606. Combining function 1602, which may be implemented as a 3:1 combiner in switch fabric 1204 of FIG. 12 followed by a 24:1 combiner in FI module 1202, reverses the 1:72 slicing operations of slicing function 1306 of FIG. 13. Similarly, reorder block 1604 reverses the shuffling operations performed by shuffle block 1304 of FIG. 13, and each decoder 1606 applies appropriate Reed-Solomon decoding to each 12-byte set of "un-shuffled" encoded data to generate a corresponding 8-byte set of error-corrected information data for the corresponding outgoing OC-48 data signal.

Figure 17:
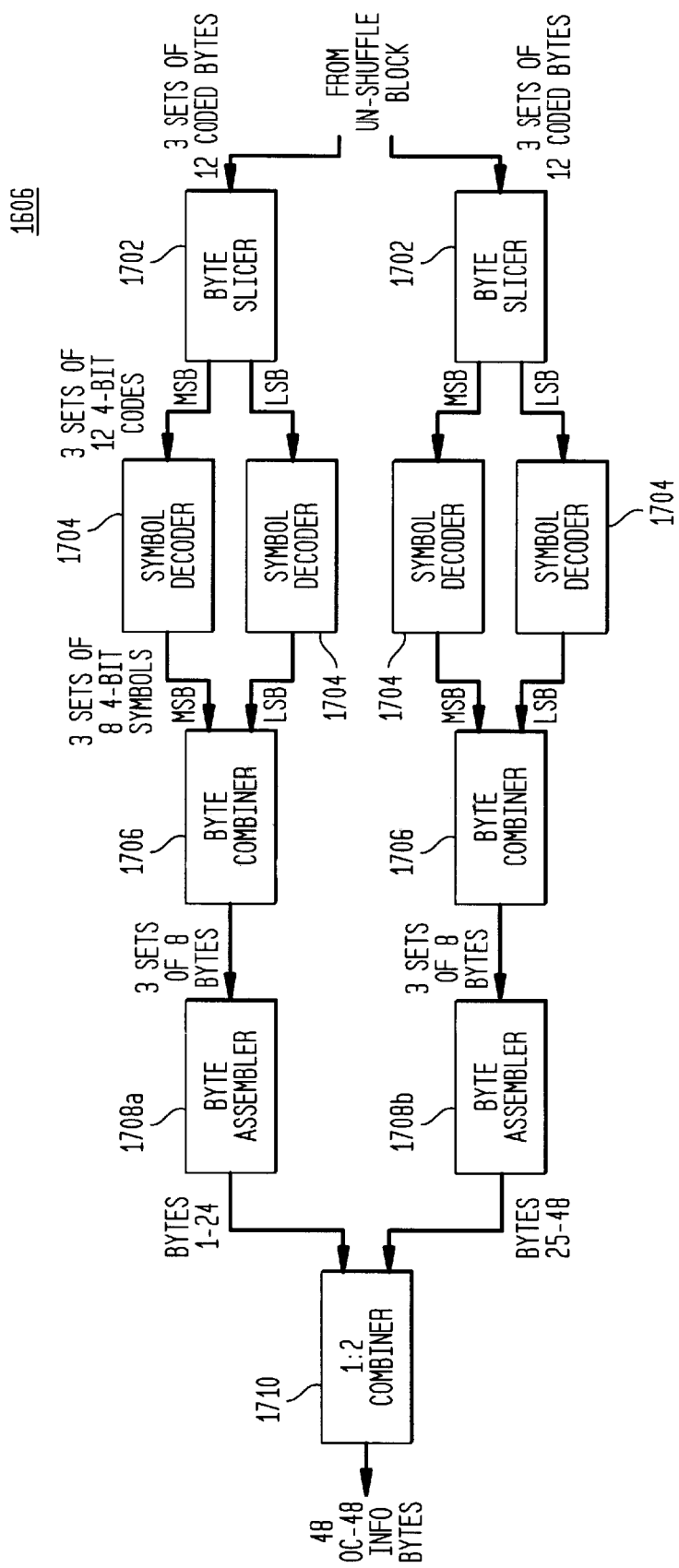
FIG. 17 shows a block diagram of the processing performed by each decoder of FIG. 16 for the corresponding outgoing OC-48 data signal.

FIG. 17 shows a block diagram of the processing performed by each decoder 1606 of FIG. 16 for the corresponding outgoing OC-48 data signal. As shown in FIG. 17, each byte slicer 1702 receives three sets of twelve bytes of encoded data from reorder block 1604 of FIG. 16 and generates three corresponding sets of twelve 4-bit MSB encoded symbols and three corresponding sets of twelve 4-bit LSB encoded symbols. Each symbol decoder 1704 applies RS [12, 8, 5] decoding over GF ($2^4$) to each corresponding set of twelve 4-bit encoded symbols to generate a set of eight 4-bit error-corrected information symbols. FIG. 5 shows one possible implementation for each symbol decoder 1704.

Each byte combiner 1706 combines the MSBs and LSBs for the different sets of eight error-corrected information symbols to generate three blocks of eight error-corrected information bytes. Byte assembler 1708a reverses the byte rearranging processing of byte rearranger 1404a of FIG. 14 to generate error-corrected information bytes 1–24, and byte assembler 1708b reverses the byte rearranging processing of byte rearranger 1404b of FIG. 14 to generate error-corrected information bytes 25–48. 1:2 combiner 1710 combines the two sets of error-corrected information bytes to generate bytes 1–48 for the corresponding outgoing OC-48 data signal.

Referring again to FIGS. 13, 14, 16, and 17, certain components perform identical functions on different sets of intermediate data corresponding to a single set of input or output data. For example, referring to FIG. 13, for each set of 48 incoming OC-48 information bytes, each encoder 1302 generates two 36-byte sets of encoded data. Each set of encoded data from the encoders is shuffled by shuffle block 1304, one after the other. As such, shuffle block 1304 may be said to perform temporally shared processing. Similarly, referring to FIG. 13, each byte slicer 1406 performs temporally shared processing on three different 8-byte blocks of information data, each symbol encoder 1408 performs temporally shared processing on three different sets of symbol data, and each byte combiner 1410 performs temporally shared processing on three different sets of encoded data. By the same token, reorder block 1604 of FIG. 16 and each byte slicer 1702, symbol decoder 1704, and byte combiner 1706 of FIG. 17 all operate using temporal sharing. Those skilled in the art will understand that this temporal sharing can be "rolled out" by implementing multiple instances of each component to operate in parallel, analogous to the four instances of symbol encoders 1408 in FIG. 14 operating in parallel. On the other hand, when the latency and buffering associated with temporal sharing is acceptable, implementing temporal sharing can be used to reduce the amount of hardware needed to implement the switch, thereby reducing cost, power consumption, circuit layout area, and/or overall size of the switch.

In the previous discussion, the present invention was discussed as it relates to only certain subsets of incoming and outgoing data signals (e.g., only the first four signals) and to only certain subsets of data in those signals (e.g., only the first 48 bytes). It will be understood that the principles underlying those discussions are to be extended in analogous manners to the rest of the data in those signals as well as to the other incoming and outgoing signals.

Although the present invention has been described in the context of a 1024×1024 switch based on a distributed synchronous switch fabric with 72 switch elements that route up to 1024 incoming and outgoing OC-48 data signals, those skilled in the art will understand that the present invention can be implemented for other applications, including those with different numbers of data signals, different types of data signals (including non-optical signals), and different numbers of transmission processing elements.

For example, in one alternative implementation, elements of the same 72-element switch fabric can be used to implement a 256×256 switch that supports up to 256 incoming and outgoing OC-48 data signals, except that, in this case, only 18 switch elements would be required. In this case, each of the 18 switch elements receives a set of four different corresponding encoded bytes for each of the 256 incoming OC-48 data signals. For example, the first switch element may receive the first four bytes of each incoming OC-48 data signal. In this case, each switch element is partitioned into four switch quadrants, where each quadrant processes one symbol and all four quadrants perform identical switch operations. In such an implementation of a 256×256 switch, four symbols will be lost as a result of failure of one switch element. Therefore, in this case, in order to increase the fault coverage, it is very important to employ shuffling analogous to the shuffling of FIGS. 15A–C described earlier for the 1024×1024 switch. As before, shuffling is used to ensure proper allocation of symbols to each switch element such that the capability of the error-correction code is not exceeded.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for transmitting data streams, comprising the steps of:
   (a) encoding a k-symbol original dataword in an incoming data stream to generate an n-symbol codeword, wherein n is greater than k;
   (b) slicing each n-symbol codeword into a plurality of codeword slices;
   (c) routing the codeword slices along a plurality of parallel paths through distributed transmission equipment to generate a plurality of routed codeword slices;
   (d) combining the plurality of routed codeword slices to generate an n-symbol routed codeword; and
   (e) decoding the n-symbol routed codeword to generate a k-symbol routed dataword of an outgoing data stream corresponding to the k-symbol original dataword in the incoming data stream.

2. The invention of claim 1, wherein the number of codeword slices is greater than k.

3. The invention of claim 2, wherein the number of codeword slices is equal to n.

4. The invention of claim 1, wherein step (e) comprises the step of correcting one or more errors in the n-symbol routed codeword when generating the k-symbol routed dataword such that the k-symbol routed dataword is identical to the k-symbol original dataword.

5. The invention of claim 4, wherein step (e) comprises the step of correcting one or more random errors in the n-symbol routed codeword.

6. The invention of claim 5, wherein step (e) comprises the step of correcting two or more random errors in the n-symbol routed codeword.

7. The invention of claim 4, wherein step (e) comprises the step of correcting one or more erasures in the n-symbol routed codeword.

8. The invention of claim 7, wherein step (e) comprises the step of correcting two or more erasures in the n-symbol routed codeword.

9. The invention of claim 4, wherein step (e) comprises the step of correcting one or more random errors and one or more erasures in the n-symbol routed codeword.

10. The invention of claim 1, wherein n is less than two times k.

11. The invention of claim 1, wherein the number of bits per symbol is less than 8.

12. The invention of claim 1, wherein steps (a) and (e) are implemented in parallel for two different sets of data: a first set corresponding to the 4 most significant bits (MSBs) of each byte in the incoming data stream and a second set corresponding to the 4 least significant bits (LSBs) of each byte in the incoming data stream.

13. The invention of claim 1, wherein the encoding of step (a) corresponds to a systematic coding scheme.

14. The invention of claim 13, wherein the encoding of step (a) and the decoding of step (e) are based on a Reed-Solomon [12, 8, 5] code over Galois field ($2^4$).

15. The invention of claim 1, wherein each codeword slice is routed through a different processing element in the distributed transmission equipment.

16. The invention of claim 1, wherein step (a) comprises the steps of:
(1) encoding corresponding sets of information data from two or more different incoming data signals to generate two or more corresponding sets of encoded data; and
(2) shuffling the two or more corresponding sets of encoded data to form a set of shuffled encoded data to increase error-correction coverage for the distributed transmission equipment.

17. The invention of claim 16, wherein:
step (a)(1) comprises the step of encoding each set of information data to generate two or more sets of encoded data; and
step (a)(2) comprises the step of shuffling the two or more sets of encoded data using temporal sharing.

18. The invention of claim 1, wherein step (a) comprises the steps of:
(1) slicing a set of incoming information data into two sets;
(2) rearranging each set of sliced incoming information data to generate one or more blocks of rearranged information data;
(3) slicing each block of rearranged information data to generate a set of MSB information symbols and a set of LSB information symbols;
(4) independently encoding each set of MSB and LSB information symbols to generate corresponding sets of MSB and LSB encoded symbols; and
(5) combining corresponding set of the MSB and LSB encoded symbols to generate a set of encoded bytes.

19. The invention of claim 18, wherein steps (3) and (4) correspond to temporally shared operations.

20. The invention of claim 1, wherein the distributed transmission equipment comprises a distributed switch fabric.

21. The invention of claim 1, further comprising the steps of identifying one or more failed processing elements in the distributed transmission equipment.

22. An apparatus for transmitting data streams, comprising:
(a) means for encoding a k-symbol original dataword in an incoming data stream to generate an n-symbol codeword, wherein n is greater than k;
(b) means for slicing each n-symbol codeword into a plurality of codeword slices;
(c) means for routing the codeword slices along a plurality of parallel paths through distributed transmission equipment to generate a plurality of routed codeword slices;
(d) means for combining the plurality of routed codeword slices to generate an n-symbol routed codeword; and
(e) means for decoding the n-symbol routed codeword to generate a k-symbol routed dataword of an outgoing data stream corresponding to the k-symbol original dataword in the incoming data stream.

23. An apparatus for transmitting data streams, comprising:
(a) one or more encoders configured to encode a k-symbol original dataword in an incoming data stream to generate an n-symbol codeword, wherein n is greater than k;
(b) one or more slicers configured to slice each n-symbol codeword into a plurality of codeword slices;
(c) distributed transmission equipment configured to route the codeword slices along a plurality of parallel paths to generate a plurality of routed codeword slices;
(d) one or more combiners configured to combine the plurality of routed codeword slices to generate an n-symbol routed codeword; and
(e) one or more decoders configured to decode the n-symbol routed codeword to generate a k-symbol routed dataword of an outgoing data stream corresponding to the k-symbol original dataword in the incoming data stream.

24. The invention of claim 23, wherein the number of codeword slices is greater than k.

25. The invention of claim 24, wherein the number of codeword slices is equal to n.

26. The invention of claim 23, wherein each decoder is configured to correct one or more errors in the n-symbol routed codeword when generating the k-symbol routed dataword such that the k-symbol routed dataword is identical to the k-symbol original dataword.

27. The invention of claim 26, wherein each decoder is configured to correct one or more random errors in the n-symbol routed codeword.

28. The invention of claim 27, wherein each decoder is configured to correct two or more random errors in the n-symbol routed codeword.

29. The invention of claim 26, wherein each decoder is configured to correct one or more erasures in the n-symbol routed codeword.

30. The invention of claim 29, wherein each decoder is configured to correct two or more erasures in the n-symbol routed codeword.

31. The invention of claim 26, wherein each decoder is configured to correct one or more random errors and one or more erasures in the n-symbol routed codeword.

32. The invention of claim 23, wherein n is less than two times k.

33. The invention of claim 23, wherein the number of bits per symbol is less than 8.

34. The invention of claim 23, wherein each encoder is configured to implement a systematic coding scheme and each decoder is configured to implement a corresponding systematic decoding scheme.

35. The invention of claim 34, wherein the systematic coding and decoding schemes are based on a Reed-Solomon [12, 8, 5] code over Galois field ($2^4$).

36. The invention of claim 23, wherein the distributed transmission equipment comprises a plurality of processing elements, each of which routes a different codeword slice.

37. The invention of claim 23, wherein each encoder comprises:

(1) a plurality of encoders configured to encoding corresponding sets of information data from two or more different incoming data signals to generate two or more corresponding sets of encoded data; and (2) a shuffle block configured to shuffle the two or more corresponding sets of encoded data to form a set of shuffled encoded data to increase error-correction coverage for the distributed transmission equipment.

38. The invention of claim 37, wherein:

each encoder is configured to process each set of information data to generate two or more sets of encoded data; and the shuffle block is configured to shuffle the two or more sets of encoded data using temporal sharing.

39. The invention of claim 23, wherein each encoder comprises:

(1) a data slicer configured to slice a set of incoming information data into two sets;

(2) one or more byte rearrangers configured to rearrange each set of sliced incoming information data to generate one or more blocks of rearranged information data;

(3) one or more byte slicers configured to slice each block of rearranged information data to generate a set of MSB information symbols and a set of LSB information symbols;

(4) one or more symbol encoders configured to independently encode each set of MSB and LSB information symbols to generate corresponding sets of MSB and LSB encoded symbols; and (5) one or more byte combiners configured to combine corresponding set of the MSB and LSB encoded symbols to generate a set of encoded bytes.

40. The invention of claim 39, wherein each byte slicer and each symbol encoder implements temporally shared operations.

41. The invention of claim 23, wherein the distributed transmission equipment comprises a distributed switch fabric.

42. The invention of claim 23, wherein information from the one or more decoders is used to identify one or more failed processing elements in the distributed transmission equipment.

* * * * *